(12) United States Patent
Cockroft

(10) Patent No.: US 9,493,581 B2
(45) Date of Patent: Nov. 15, 2016

(54) PROCESS FOR THE MANUFACTURE OF VISCOSE

(71) Applicant: INNOVIA FILMS LIMITED, Wigton, Cumbria (GB)

(72) Inventor: Martin Richard Cockroft, Wigton (GB)

(73) Assignee: INNOVIA FILMS LIMITED, Wigton, Cumbria (GB)

(*) Notice: Subject to any disclaimer, the term of this patent is extended or adjusted under 35 U.S.C. 154(b) by 0 days.

(21) Appl. No.: 14/397,467

(22) PCT Filed: Apr. 30, 2013

(86) PCT No.: PCT/GB2013/051105
§ 371 (c)(1),
(2) Date: Oct. 27, 2014

(87) PCT Pub. No.: WO2013/164598
PCT Pub. Date: Nov. 7, 2013

(65) Prior Publication Data
US 2015/0126729 A1 May 7, 2015

(30) Foreign Application Priority Data

May 2, 2012 (GB) .................................. 1207708.7

(51) Int. Cl.
*C08B 9/00* (2006.01)
*D01F 2/06* (2006.01)
*D01F 2/02* (2006.01)

(52) U.S. Cl.
CPC .. *C08B 9/00* (2013.01); *D01F 2/06* (2013.01)

(58) Field of Classification Search
CPC .................................. C08B 9/00; D01F 2/06
USPC .................................................... 536/57, 60
See application file for complete search history.

(56) References Cited

U.S. PATENT DOCUMENTS

| | | | |
|---|---|---|---|
| 1,955,092 | A | 4/1934 | Richter |
| 2,222,050 | A | 11/1940 | Stoeckly et al. |
| 2,859,210 | A | 11/1958 | Seaman et. al. |
| 3,600,379 | A | 8/1971 | Sihtola et. al. |
| 3,728,330 | A | 4/1973 | Sihtola et. al. |
| 3,935,022 | A | 1/1976 | Sihtola |
| 4,163,840 | A | 8/1979 | Geyer, Jr. et al. |
| 4,210,747 | A | 7/1980 | Sorsa et al. |
| 4,269,973 | A | 5/1981 | Geyer, Jr. et al. |
| 4,287,334 | A | 9/1981 | Fauth et al. |
| 6,837,972 | B2 * | 1/2005 | Marsh ..................... B32B 29/00 162/111 |
| 2008/0003429 | A1 * | 1/2008 | Luo .......................... C08B 1/08 428/373 |

FOREIGN PATENT DOCUMENTS

| | | | | |
|---|---|---|---|---|
| CN | 101545150 A | | 9/2009 | |
| EP | 0 023 527 A1 | | 2/1981 | |
| EP | 1 873 302 A2 | | 1/2008 | |
| EP | 1873302 B1 * | | 10/2010 | ............... C08B 1/08 |
| GB | 711 040 A | | 6/1954 | |
| GB | 734 216 A | | 7/1955 | |
| WO | 2007/144824 A2 | | 12/2007 | |
| WO | 2013/055717 A1 | | 4/2013 | |

OTHER PUBLICATIONS

International Search Report and the Written Opinion of the International Searching Authority in International Patent Application No. PCT/GB2013/051105 mailed on Aug. 9, 2013.
Combined Search and Examination Report under Sections 17 and 18(3) of Application No. GB1207708.7 dated Aug. 31, 2012.

* cited by examiner

*Primary Examiner* — Sudhakar Katakam
*Assistant Examiner* — Everett White
(74) *Attorney, Agent, or Firm* — Ping Wang; Andrews Kurth Kenyon LLP

(57) ABSTRACT

A process for the manufacture of viscose comprises the steps of: a) providing a non-dissolving pulp as a raw material; b) steeping the pulp in caustic solution; c) processing the steeped pulp; d) steeping the processed steeped pulp for a second time in caustic solution; and e) further processing the pulp from step d) to form a viscose solution.

26 Claims, 13 Drawing Sheets

PROCESS FOR THE MANUFACTURE OF VISCOSE

This application is a national stage application of International Patent Application No. PCT/GB2013/051105, filed Apr. 30, 2013, which claims priority to United Kingdom Patent Application No. 1207708.7, filed May 2, 2012. The entirety of the aforementioned applications is incorporated herein by reference.

FIELD

The present invention concerns the viscose process and certain improvements therein, as well as products resulting from or formed as intermediates in such a process.

In addition to its utility in the industrial production of paper, cellulose-containing pulp has a number of other applications, including the industrial manufacture of viscose.

There are numerous sources of cellulose-containing pulps, for example wood (especially softwood), cotton, flax, hemp and bamboo. Pulp is generally prepared from those raw materials by treatment to separate out and remove lignin and hemi-cellulose, so as to maximise the cellulose content of the pulp.

There are two general pulping techniques known to those skilled in the art. Firstly, pulp can be prepared mechanically, by milling or grinding the raw material to physically separate cellulose fibres from hemi-cellulose and lignin.

Alternatively, the raw material can be chemically treated to dissolve lignin and hemi-cellulose, ideally without disrupting the cellulose fibres native to the raw material. Examples of chemical pulping processes include the Kraft process and the Sulphite process.

There are also a number of hybrid pulping processes where chemical processing steps are employed in a mechanical pulping process, or vice versa. Examples of such processes include thermomechanical processes, where, in addition to mechanical comminution, wood chips or other raw materials are also exposed to heat, and chemithermomechanical processes, where wood chips are firstly exposed to chemicals used in chemical pulping processes before comminution and exposure to heat.

For those skilled in the art of cellulose regeneration, there are two classes of pulp obtained from chemical pulping processes. Firstly, there are 'dissolving pulps' or 'dissolving grade pulps', which are used as feedstocks in the viscose process. Dissolving pulps are characterised by a high cellulose content, around 90% or higher. As their name suggests, they are soluble in solvents or dopes used in commercial cellulose regeneration processes.

The other class of pulps are 'non-dissolving pulps', examples of which include 'market pulps' or 'fluff pulps'. These have limited utility in the viscose process because, as their name suggests, they are not soluble in conventionally used processing solutions or dopes. Accordingly, they are principally used in applications other than cellulose regeneration. For example, over 80% of all fluff pulp is used in the production of baby diapers.

Owing to the lower cost of non-dissolving pulps, as compared to dissolving pulps, there have been attempts made previously to employ non-dissolving pulps in the viscose process. However, as a result of their deleterious effects on the properties of the resulting viscose solutions, they can only be used in low proportions, as filler materials, making up no more than about 5 to 10% of the total pulp used.

Examples of commercially available non-dissolving pulps include Pearl 429 (Weyerhauser), Peach (Weyerhauser), Fluff 416 (Weyerhauser), Port Wentworth SBSK (Weyerhauser) and Bleached *Eucalyptus* pulps available from Fibria, UPM and ENCE.

In addition to their dissolution properties, non-dissolving pulps differ from dissolving pulps in a number of ways. For example, they generally have higher hemi-cellulose content, a lower alpha-cellulose content, are less refined, have higher degrees of polymerisation (DP) and/or have lower quality control than dissolving pulps.

As those skilled in the art will be aware, the viscose process as generally practised includes the steps of slurrying a pulp in caustic soda, steeping it in the caustic solution, xanthating the cellulose with carbon disulphide, and dissolving it in an aqueous caustic solution to form viscose.

Viscose is typically filtered and re-filtered in order to maximise the purity of the material to improve the product quality. It can then be formed into a desired shape using techniques known to those in the art, for example by extruding it through a spinneret to form a fibrous material, or extruding it through a slit or rollers to form a sheet of film. The formed viscose is then contacted with an acidic casting solution to regenerate the cellulose from viscose.

Additionally, extruded cellulose film may also be passed through additional rollers and baths to clean and soften the film and to obtain the desired optical and mechanical properties.

In certain applications, between the steeping and the xanthation steps, the steeped cellulose slurry or solution may be subjected to mercerisation, where a portion of the caustic liquid is removed to achieve an alkali cellulose having a target cellulose and soda content. The purpose of this step is to improve the properties of the cellulose, notably by reducing its degree of polymerisation (DP).

If a non-dissolving pulp is subjected to these steps as conventionally practised, the resulting viscose solution will have unacceptably low filterability for shape forming applications. It is this adverse effect on the filterability of viscose solutions which has prevented non-dissolving pulps being used in the viscose process in proportions greater than about 5 to 10% by weight of the total pulp.

Dissolving pulps, on the other hand, which are optimised for use in the viscose process can be used to produce viscose liquids which exhibit a high level of filterability.

Filterability can be measured using a number of different testing methods.

The reduced filtration value (Rv) describes the filterability of viscose, taking into account its viscosity and the porosity of the filter membrane used.

To determine Rv, a viscose sample is loaded into a steel laboratory filtration rig and pressurised to 2 bar. The pressure is maintained at 2 bar throughout the test. Once the viscose is visibly passing through the filtration membrane, the timer is started and the weight of the viscose collected is recorded at 5 minute intervals for a total of 30 minutes.

TVW is a measure of the total amount of viscose filtered within the 30 minute period.

To calculate Rv from the experimental data, the following equation is used:

$$Rv = \frac{F_w}{\sqrt{S_0}}$$

Fw=the filter value used to describe the filterability of the viscose and $S_0$=a constant calculated as the initial and instantaneous flow of viscose through the filtration membrane in $m^3/t$, where t=the period of filter operating time in hours.

Fw is calculated as follows:

$$Fw = \frac{2}{K_w}$$

Kw=the filter clogging value (the clogging constant (kw)× 10,000).

The clogging constant (kw) is calculated as the gradient of the line generated when t/M is plotted against t. Thus, Kw can be calculated from the expression:

$$Kw = \frac{10,000 \times ((t_2/M_2) - (t_1/M_1))}{(t_2 - t_1 \times 0.6 \times n^{0.4})}$$

M=the amount of filtrate and t=time

Typically, the higher the Rv and TVW values, the higher the quality of the viscose, as it does not clog or block the filtration membrane. The Rv value for laboratory viscose is usually considerably higher than that of the equivalent industrial viscose (manufactured at a plant). The table below can be used as a guide to help understand the link between the quality of laboratory viscose and the likely quality of the equivalent industrial viscose.

they involve blending with a dissolving pulp, utilising additional reagents, maintaining a reduced temperature, and/or operating at increased pressure. Furthermore, when the alpha-cellulose content of the pulp is less than 90%, the resultant viscose solution does not necessarily have the required filterability for shape forming applications.

EP 1 873 302 discloses a method for processing high hemi-cellulose in viscose manufacture and products therefrom, wherein the pulp containing a high hemi-cellulose level is blended with a dissolving grade pulp during or after steeping, and converted to viscose.

U.S. Pat. No. 3,935,022 discloses a process for removing hemi-cellulose from circulating caustic liquors, principally originating in the alkaline refining of pulp or viscose manufacture, which involves adding a sufficient amount of ethanol to cause precipitation of the hemi-cellulose from the caustic liquor, separating the precipitate from the caustic liquor and recovering a substantially purified caustic liquor. This process enables non-dissolving pulps to be utilised in the viscose manufacturing processes outlined in U.S. Pat. No. 3,600,379 or U.S. Pat. No. 3,728,330.

U.S. Pat. No. 4,210,747 discloses a process for the preparation of viscose from paper grade pulp which consists of adding to said pulp, steeping lye in excess of the amount required for steeping the pulp and at least one organic compound such as an alcohol or ester.

GB 711,040 discloses a process for manufacturing low alkali viscose from raw cellulose having a degree of polymerization (DP) of above 800; wherein the raw cellulose is

| Lab Rv | Expected Plant Rv | Plant Press Time | Guidelines/Notes | 1st Trial Success Probability | Filtration Quality |
|---|---|---|---|---|---|
| <150 | <6 | <1 hr | Do not run trial. Resultant viscose will not filter easily, if at all. | <10% | Very Bad filtration |
| 150-300 | 7-10 | 2-4 hrs | Trial would probably run; however, there may be some long term filtration issues. Further lab/plant trials would be required to optimise processing parameters before long term running. | 20-30% | Bad - Acceptable Filtration |
| 300-500 | 10-20 | 4-6 hrs | Trial would run on plant; however plant efficiency would probably be affected. Potential for occasional filtration issues. | 30-50% | Acceptable filtration |
| 500-900 | 20-40 | Potential 2 press time | Expected Dissolving Pulp performance. | 50-70% | Acceptable - Good filtration |
| >900 | 40+ | 2 Press time | High quality viscose with no filtration issues; however this may lead to high SI and long ripeness, which suggests $CS_2$/SiV reduction may be necessary. | >70% (if corrections made) | Good - Excellent filtration |

Ball fall velocity (BFV), measured in seconds, is a measure of the time it takes for a steel ball weighing 0.13 g+/−0.02 g to sink to the bottom of a sample of viscose solution having a depth of 205 mm.

As an alternative technique for quantifying the quality of a viscose solution, the fibre count method can be used, in which the quantity of residual fibres in the solution is measured.

As previously mentioned, attempts have been made to manufacture viscose from non-dissolving pulps, but the processes employed tend to be more costly and/or complicated than the conventional viscose process, for example steeped in a caustic soda solution, the concentration of which varies inversely with the DP of the cellulose within the range of 17% by weight for 800 DP to 13% by weight for 1400 DP, at reduced pressure at the beginning and thereafter at a pressure of one to fifteen atmospheres varying inversely with the concentration of the steeping solution.

U.S. Pat. No. 4,287,334 discloses a viscose-manufacturing process comprising treating cellulose with an alkali metal hydroxide solution in a first alkalization step, freeing the alkalized cellulose from at least part of the excess hydroxide solution without pressing the cellulose, and treating the cellulose with a second alkali metal hydroxide solution in a second alkalization step while maintaining the temperature of the reaction mixture at not more than 18° C.

EP 0 023 527 discloses a process and apparatus for making alkali cellulose having a desired predetermined degree of polymerisation in which cellulose is steeped in an alkali hydroxide bath, generally 17 to 25% sodium hydroxide, and then passed through an RF treatment chamber where it is subjected to an RF energy field, to produce a controlled depolymerisation thereof. Upon emergence from the steeping bath, the cellulose passes to an excess solution removing means, such as one or a series of pairs of nip rolls where the excess solution is expressed from the cellulose and the amount of absorbed alkali is controlled. A second, lower concentration, steep bath follows the RF treatment chamber.

U.S. Pat. No. 4,163,840 discloses a process and apparatus for making alkali cellulose which comprises continuously steeping indefinite length sheets of cellulose in an alkali hydroxide bath, generally 17 to 25% sodium hydroxide, and then passing the cellulose strip through a chamber where it is subjected to extremely rapid mercerising conditions, including an RF energy field, to produce depolymerisation thereof. A second, lower concentration, steep bath follows the rapid mercerisation step. A similar process is disclosed in U.S. Pat. No. 4,269,973.

From the prior art, it can be seen that there remains a need in the art to optimise the viscose process to enable less costly non-dissolving pulps to be used in cellulose processing methods.

BRIEF DESCRIPTION OF THE DRAWINGS

The invention will now be illustrated by the following examples, and with reference to the figures in which.

DETAILED DESCRIPTION

Figure 1:
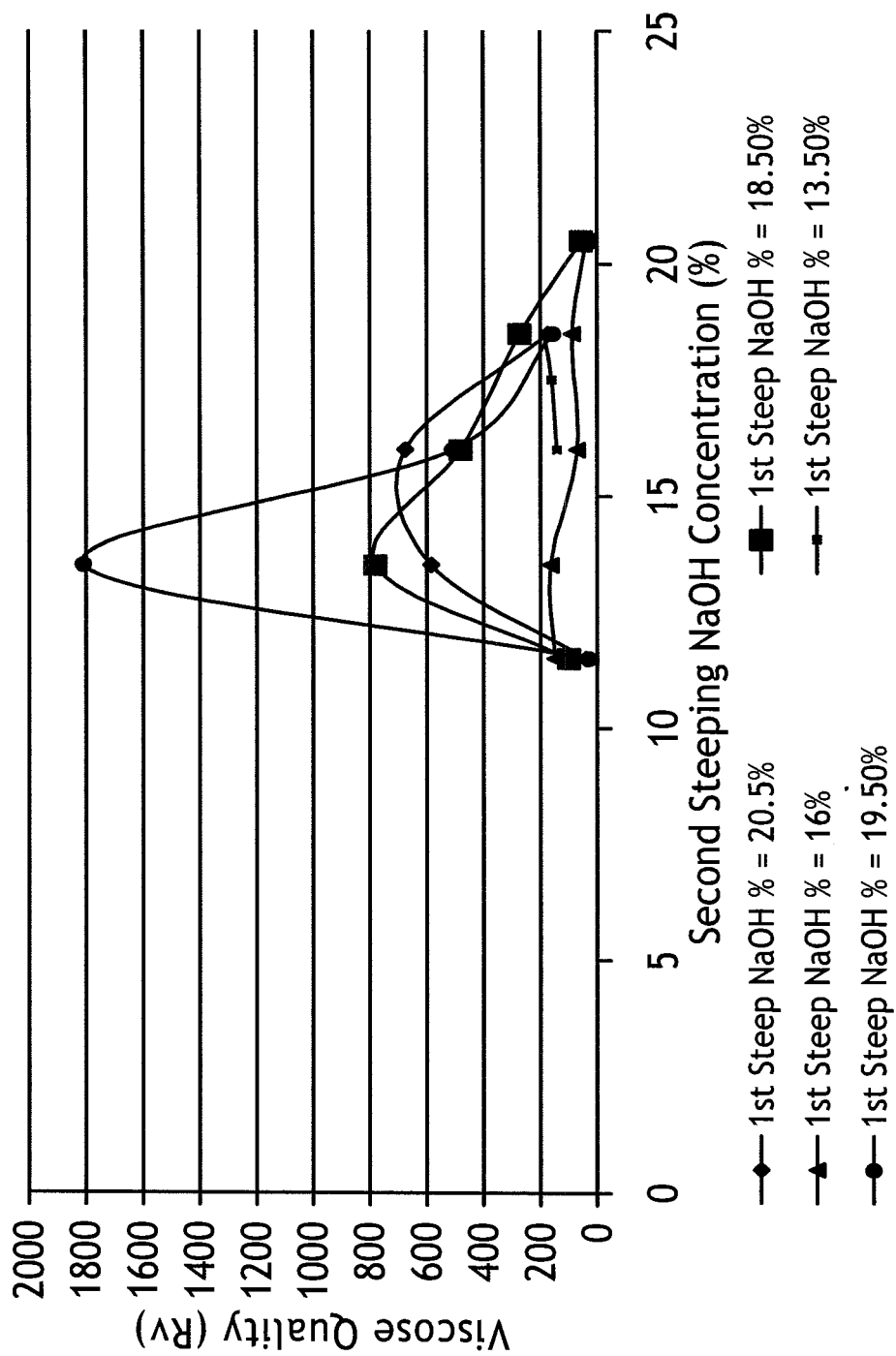
FIG. 1 is a graph showing the relationship between viscose quality (Rv) and NaOH concentration in the second steep under controlled first steep conditions for Southern Bleached Softwood Kraft pulp in a double steep process.

Thus, according to a first aspect of the present invention, there is provided a process for the manufacture of viscose comprising the steps of:
a. providing a non-dissolving pulp as a raw material;
b. steeping the pulp in caustic solution;
c. processing the steeped pulp;
d. steeping the processed steeped pulp for a second time in caustic solution; and
e. further processing the pulp from step d) to form a viscose solution;
wherein the steeping conditions are selected such that:
  i. when the pulp comprises a Softwood Kraft pulp as at least the or a major component, the caustic concentration of the solution in step d) is at least about 11.5% w/w and the ratio of caustic concentration in the solution of step b) to that of the solution in step d) (the S1/S2 ratio) is from 1 to 1.8;
  ii. when the pulp comprises a Bleached *Eucalyptus* pulp as at least the or a major component, the caustic concentration of the solution in step d) is from 15% w/w to 20% w/w and the ratio of caustic concentration in the solution of step b) to that of the solution in step d) (the S1/S2 ratio) is from 0.1 to 5; and
  iii. when the pulp comprises a non-dissolving pulp other than a Softwood Kraft or Bleached *Eucalyptus* pulp as at least the or a major component, the caustic concentration of the solution in step d) is at least about 11.5% w/w and the ratio of caustic concentration in the solution of step b) to that of the solution in step d) (the S1/S2 ratio) is from 0.1 to 5.

Advantageously, the optimised processing conditions of the present invention can be used to form high-quality viscose solutions, which may be used in the preparation of cellulose shaped articles, from non-dissolving pulps.

Where the pulp is said to comprise a component which is present as 'at least the or a major component', what is meant is that the component in question constitutes: at least about 25%, at least about 33%, at least about 50% or at least about 51% of the raw material pulp.

As mentioned above, the skilled artisan will understand what is meant by a non-dissolving pulp. S/he will identify that such pulps exhibit one or more of the following properties: relatively high hemi-cellulose content (typically about 10% or greater), relatively low alpha-cellulose content (typically about 90% or lower, more typically about 83 to 89%), less refined, relatively high degrees of polymerisation (DP) (typically about 700 to about 1200) and/or have relatively low quality control, as compared to dissolving pulps.

Examples of such non-dissolving pulps include fluff pulp, cotton linters, Softwood pulps, Hardwood pulps, such as maple, and mixed Hardwood pulps. The non-dissolving pulp may be chemically treated via a process such as the sulphite process or sulphate (Kraft) process. The non-dissolving pulp may also be bleached during its manufacture.

The raw material may comprise a single non-dissolving pulp selected from a Softwood Kraft pulp, a Bleached *Eucalyptus* pulp, or a non-dissolving pulp other than a Softwood Kraft or Bleached *Eucalyptus* pulp. Alternatively, the raw material may comprise two or more non-dissolving pulps selected from: a Softwood Kraft pulp; a Bleached *Eucalyptus* pulp; and a non-dissolving pulp other than a Softwood Kraft or Bleached *Eucalyptus* pulp. Preferably, at least two of the steeping conditions are selected with reference to at least one of the raw material pulp constituents.

In step b) the pulp is steeped in a caustic solution, this caustic solution typically comprises an alkali metal hydroxide such as sodium hydroxide. The concentration of the caustic solution may be in the range of 10% to 25% w/w.

The concentration of caustic solution required in step b) may depend on the type of non-dissolving pulp present.

When the pulp comprises Northern Bleached Softwood Kraft pulp or Southern Bleached Softwood Kraft pulp as at least the or a major component, the caustic concentration is preferably from 17% w/w to 22% w/w.

When the pulp comprises Bleached *Eucalyptus* Kraft pulp as at least the or a major component, the caustic concentration is preferably from 11.5% w/w to 19.5% w/w.

In step d) the processed steeped pulp is steeped for a second time in caustic solution. Again, this caustic solution typically comprises an alkali metal hydroxide such as sodium hydroxide. The caustic concentration in step d) may be at least about 11.5% w/w, at least about 12.5% w/w, at least about 14.5% w/w, at least about 16.5% w/w, at least about 18.5% w/w or at least about 20.5% w/w.

The concentration of caustic solution required in step d) may depend on the type of non-dissolving pulp present.

When the pulp comprises a Softwood Kraft pulp as at least the or a major component, the caustic concentration in step d) may be at least about 11.5% w/w. When the pulp comprises Northern Bleached Softwood Kraft pulp or Southern Bleached Softwood Kraft pulp as at least the or a major component of the non-dissolving pulp, the caustic concentration is preferably from 11.5% w/w to 18.5% w/w, more preferably from 12.5% w/w to 17.5% w/w or more preferably still from 12.5% w/w to 16.5% w/w.

When the pulp comprises a Bleached *Eucalyptus* pulp as at least the or a major component, the caustic concentration in step d) may be from 15% w/w to 20% w/w. When the pulp comprises Bleached *Eucalyptus* Kraft pulp as at least the or a major component, the caustic concentration is preferably from 15.5% w/w to 19.5% w/w, more preferably from 16% w/w to 19% w/w, more preferably still from 16.5% w/w to 18.5% w/w and most preferably from 17% w/w to 18% w/w.

When the pulp comprises a non-dissolving pulp other than a Softwood Kraft or Bleached *Eucalyptus* pulp, for example hardwood pulp, fluff pulp and/or cotton linters, as at least the or a major component, the caustic concentration in step d) may be at least about 11.5%, at least about 12.5% w/w, at least about 14.5% w/w, at least about 16.5% w/w, at least about 18.5% w/w or at least about 20.5% w/w.

The inventors of the present invention have discovered a direct relationship between the caustic concentration in step b) and the caustic concentration in step d) (i.e. the caustic concentration in the first steep (S1) and second steep (S2)), and the quality of the resultant viscose solution. The optimum S1/S2 ratio may depend on the type of non-dissolving pulp present.

When the pulp comprises a Softwood Kraft pulp as at least the or a major component, the S1/S2 ratio may be from 1 to 1.8.

When the pulp comprises Northern Bleached Softwood Kraft pulp or Southern Bleached Softwood Kraft pulp as at least the or a major component, the S1/S2 ratio is preferably from 1.1 to 1.7, and more preferably from 1.15 to 1.55.

When the pulp comprises a Bleached *Eucalyptus* pulp as at least the or a major component, the S1/S2 ratio may be from 0.1 to 5. When the pulp comprises Bleached *Eucalyptus* Kraft pulp as at least the or a major component, the S1/S2 ratio is preferably from 0.5 to 4, more preferably from 0.6 to 3, and more preferably still from 0.7 to 2.

When the pulp comprises a non-dissolving pulp other than Softwood Kraft or Bleached *Eucalyptus* pulp, for example hardwood pulp, fluff pulp and/or cotton linters, as at least the or a major component, the S1/S2 ratio may be from 0.1 to 5, preferably from 0.5 to 4, more preferably from 0.6 to 3, and more preferably still from 0.7 to 2.

The temperature of the steeping process in step b) may be the same or different from the temperature of the steeping process in step d). Preferably, the temperature of the steeping process in step b) is different from that in step d), more preferably the temperature of the steeping process in step b) is higher than that in step d).

The temperature of the steeping process in step b) may be at least about 25° C., at least about 30° C., at least about 35° C., at least about 40° C., at least about 45° C., at least about 50° C. or at least about 55° C. The temperature of the steeping process in step d) may be at least about 28° C., at least about 30° C., at least about 35° C. or at least about 40° C.

The steeping process in step b) and/or step d) is generally conducted for about 5 to 120 minutes.

The manufacturing process may comprise one or more additional steeping steps, wherein the pulp is re-steeped in a caustic solution.

The manufacturing process may comprise the removal of hemi-cellulose from the steeping caustic in step b) and/or step d). The amount of hemi-cellulose removed from the steeping caustic in step b) and/or step d) may be at least about 50%, at least about 60%, at least about 70%, at least about 80%, at least about 90% or at least about 95%. The process may further comprise reintroducing at least some of the removed hemi-cellulose into the process downstream of its removal. The removed hemi-cellulose, or some of it, is preferably reintroduced into the pulp or the viscose solution during or after step e).

One or more steeping additives may be present or added during the manufacturing process. Preferably the steeping additive is present in at least one of step b) and/or step d). Steeping additives function by holding open the cellulose structure and the skilled artisan will be familiar with such materials. Examples of steeping additives which may be used include glycerol and/or alkoxylated alcohols, especially ethoxylated alcohols. Examples of especially preferred steeping additives are Berol 388 and Berol 44. Where used, a steeping additive, such as Berol 388, is preferably added in an amount of from 0.01% to 5.0%, from 0.01% to 2.5%, from 0.01% to 1.0% or 0.01% to 0.5% by weight of cellulose.

Additionally or alternatively, one or more swelling agents may be present or added during the manufacturing process. Preferably the swelling agent is present in at least one of steps b) to e), more preferably in at least one of steps b) and/or step d). Specific examples of swelling agents that may be employed in the process of the present invention include polyethylene glycols, polyvinyl alcohols or polyacrylates.

Additionally or alternatively, one or more catalysts may be present or added during the manufacturing process. Preferably the catalyst is present in at least one of steps b) to e), more preferably in at least one of steps b) and/or step d). A preferred catalyst is manganese(II) sulfate ($MnSO_4$) which may be present in an amount of from 0.01% to 1% by weight of cellulose.

Step c) may comprise subjecting the steeped pulp to a drainage step. Preferably the drainage step involves pressing the steeped pulp which may help to remove any excess basic liquid. Following this, the pressed pulp may be shredded. If performed, the drainage step and/or the shredding step will preferably result in a cellulose crumb product.

Additionally or alternatively, step c) may comprise a mercerisation step. The purpose of the mercerisation step is to improve the properties of the cellulose contained in the pulp, for example, by reducing the degree of polymerisation in the cellulose. The mercerisation step may also involve removing a portion of the alkali liquid from the steeped pulp.

In a preferred embodiment, step c) involves pressing and shredding the steeped pulp from step b) to form a cellulose crumb, followed by mercerising the cellulose crumb.

step e) may comprise a drainage step, shredding step and/or a mercerisation step as described above, prior to forming the viscose solution.

In a preferred embodiment, step e) comprises pressing and then shredding the steeped pulp from step d) prior to forming the viscose solution.

Step e) may comprise xanthating the pulp to form a viscose solution. Preferably xanthation is carried out after the steeped pulp from step d) has been pressed, shredded and/or mercerised.

Xanthation may be achieved by contacting the pulp with carbon disulphide at a temperature in the range of from 15° C. to 40° C., from 20° C. to 30° C., or from 25° C. to 28° C. The carbon disulphide may be present in an amount of 10% to 50%, 15% to 45%, 20% to 40% or 25% to 35% by weight of the cellulose. The carbon disulphide may be in a liquid, aqueous or gaseous state.

Advantageously, it has been found that the amount of carbon disulphide used in xanthation may be significantly reduced compared to that used in conventional viscose manufacturing processes. For example, the amount of carbon disulphide used may be as low as 21% to 25% by weight of cellulose. This could have the benefit of reducing the consumable chemical cost of the viscose process and may have an environmental benefit as it may cause a reduction in the amount of $H_2S$ produced.

Following xanthation, the processed pulp may then be dissolved in a basic liquid, for example a caustic solution. The caustic solution preferably comprises sodium hydroxide. A quantity and concentration of basic liquid is preferably used which results in a viscose solution having a cellulose in viscose content (CiV) of about 1% to 20%, about 5% to 15%, about 5% to 10% or about 8% to 10% and/or a soda in viscose content (SiV) of about 1% to 15%, about 1% to 10%, about 2% to 8% or about 3% to 7%. The quantity and concentration of the basic liquid required may depend on the type of non-dissolving pulp present. Dissolution is preferably carried out at a temperature of at least 5° C., at least 10° C., at least 15° C., at least 20° C. or at least 25° C.

Generally, as a result of the process to which the pulp is subjected to as part of the present invention, viscose solutions formed entirely from treated non-dissolving pulps may be prepared. However, those skilled in the art may nevertheless wish to produce solutions from a mixture of dissolving and non-dissolving pulps. Accordingly, in preferred embodiments of the present invention, at least about 15% of the pulp used in the process will be a treated non-dissolving pulp. In more preferred embodiments, at least about 25%, at least about 50%, at least about 70%, at least about 90%, at least about 95% or even at least about 98% of the pulp used is treated non-dissolving pulp.

When the process is carried out on a laboratory scale, the viscose solution preferably has an Rv of at least about 300 i.e. the viscose solution has a 'laboratory Rv' of at least about 300. As previously mentioned, the Rv value for laboratory viscose is usually considerably higher than that of the equivalent industrial viscose. Thus, when the process is carried out on an industrial scale (manufactured at a plant), the resultant viscose solution preferably has an Rv of at least about 10 i.e. the viscose solution has a 'plant Rv' of at least about 10.

The process of the present invention may further comprise the step of casting a cellulose shaped article from the viscose solution. The techniques for doing so will be well known to those skilled in the art. For example, where the shaped articles are cellulose fibres, those fibres are preferably formed by extruding the cellulose solution through a spinneret, to produce a fibrous material. However, any fibre-forming techniques and apparatus may be employed.

According to a second aspect of the present invention, there is provided viscose obtained or obtainable by the process described above.

The viscose may be identifiable by means of selecting a characterisation criterion of the non-dissolving pulp and determining the presence of the selected characterisation criterion in the viscose. Preferably, the selected characterisation criterion comprises a unique molecular fingerprint of the non-dissolving pulp.

One method of identifying the viscose using the unique molecular fingerprint of the non-dissolving pulp from which it was formed, involves the use of analytical pyrolysis gas chromatography-mass spectrometry (GC-MS). In this method, pyrolysis of the viscose sample produces a mixture of gaseous components which are analysed using GC-MS. More specifically, the mixture of gaseous components is separated along a chromatographic column according to their affinity to the stationary phase i.e. the greater the affinity, the longer the retention time. Analytes which elute from the column then pass into a mass spectrometer where they are ionised, fragmented and detected. Each chromatographic peak is assigned its own mass spectrometry profile, thus analytes can be identified and characterised. Assignments of the different components are made based upon correlation to a database of mass spectra of target compounds.

Ultimately, a pyrolysis molecular fingerprint of the viscose is generated and this can be compared to the pyrolysis molecular fingerprint of different types of non-dissolving pulp. Statistical modelling may be used to generate an overall percentage score to see how well the pyrolysis molecular fingerprints of the viscose and the non-dissolving pulp match one another i.e. the higher the % match, the more likely the viscose was formed from the type of non-dissolving pulp being tested. Thus, it is possible to determine the type of non-dissolving pulp that was used to form the viscose.

A regenerated cellulosic article may be prepared by contacting the viscose with an antisolvent.

For the avoidance of any doubt, references to features of the first aspect of the present invention discussed above are optionally applicable to the viscose of the second aspect, where appropriate.

According to a third aspect of the present invention, there is provided a film or fibre obtained or obtainable from the process of identifying viscose by means of selecting a characterisation criterion of the non-dissolving pulp and determining the presence of the selected characterisation criterion in the viscose.

In a certain embodiment, a useful article may be manufactured from the film or fibre.

Southern Bleached Softwood Kraft pulp (a non-dissolving pulp) was used to prepare various viscose solutions.

In this set of experiments, Southern Bleached Softwood Kraft pulp (hereinafter 'the pulp') was steeped in a liquor having a specific NaOH concentration at 55° C. for 30 minutes in the presence of 0.015% $MnSO_4$ catalyst by weight of cellulose. The NaOH concentration was varied in each experiment between 13.5% w/w and 22.5% w/w.

The resultant steeped pulp was pressed using standard laboratory conditions (a steel press box with wire gauze, pressed hydraulically to 10 psi for 30 seconds) and shredded. The resultant pulp was mercerised at a temperature of 50° C. for 200 minutes, with the aim of ending the mercerisation when the degree of polymerisation had dropped to approximately 450.

The product was steeped for a second time in a liquor having a specific NaOH concentration at 40° C. for 15 minutes in the presence of 0.08% Berol 44 and 0.25% Berol 388 by weight of cellulose (no catalyst was added in the second steep). The NaOH concentration was varied in each experiment between 11.5% w/w and 20.5% w/w. The resultant product was pressed and shredded as above.

Xanthation of the product was carried out under a vacuum pressure of 25 mm/Hg using 31% $CS_2$ by weight of cellulose at a temperature of 27° C. for 140 minutes. The resulting product was then dissolved to obtain a viscose solution having a cellulose in viscose (CiV) content of 9.15% and a soda in viscose (SiV) content of 6%.

The Rv and TVW values of the resulting viscose solutions are provided in Table 1.

TABLE 1

Rv and TVW values for Southern Bleached Softwood Kraft pulp in double steep optimisation experiments

| Steeping Caustic | | | AC | Results | | |
|---|---|---|---|---|---|---|
| Steep 1 NaOH conc. (% w/w) | Steep 2 NaOH conc. (% w/w) | S1/S2 NaOH conc. ratio | SiAC after $2^{nd}$ steep | Rv | TVW | Total hemicellulose removed (g) |
| 22.5 | 16 | 1.41 | 14.8 | 504 | 196 | — |
| 21.5 | 16 | 1.34 | 14.5 | 398 | 155 | — |
| 20.5 | 11.5 | 1.78 | 11.9 | 38 | 89 | 32.63 |
| 20.5 | 13.5 | 1.52 | — | 585 | 225 | — |
| 20.5 | 16 | 1.28 | — | 676 | 156 | — |
| 20.5 | 18.5 | 1.11 | — | 172 | 104 | — |
| 19.5 | 13.5 | 1.44 | 13.7 | 1896 | 134 | — |
| 19.5 | 16 | 1.22 | — | 509 | 97 | — |
| 19.5 | 18.5 | 1.05 | — | 156 | 150 | — |
| 18.5 | 11.5 | 1.61 | — | 100 | 50 | — |
| 18.5 | 13.5 | 1.37 | 13.1 | 781 | 203 | 14.18 |
| 18.5 | 16 | 1.16 | 14.5 | 480 | 116 | 13.33 |
| 18.5 | 18.5 | 1.0 | 15.8 | 273 | 73 | 31.53 |
| 18.5 | 20.5 | 0.9 | — | 54.6 | 62 | — |
| 17.5 | 13.5 | 1.30 | 13.5 | 355 | 155 | — |
| 16 | 11.5 | 1.39 | 11.8 | 149 | 47 | 34.74 |
| 16 | 13.5 | 1.19 | 13.21 | 163 | 47 | 12.02 |
| 16 | 16 | 1 | 14.71 | 70 | 112 | 16.59 |
| 16 | 18.5 | 0.86 | 16 | 88 | 103 | 18.29 |
| 16 | 20.5 | 0.78 | 17.1 | 38.9 | 71 | 18.65 |
| 13.5 | 16 | 0.84 | 14.4 | 141 | 77.6 | 34.35 |
| 13.5 | 17.5 | 0.77 | 15.5 | 161 | 117 | 17.1 |
| 13.5 | 18.5 | 0.73 | 15.9 | 186 | 186 | 16.54 |

Typically, the higher the Rv and TVW values, the higher the quality of the viscose, as it does not clog or block the filter cloth.

FIG. 1 shows the relationship between viscose quality (Rv) and the NaOH concentration in the second steep under controlled first steep conditions.

Figure 2:
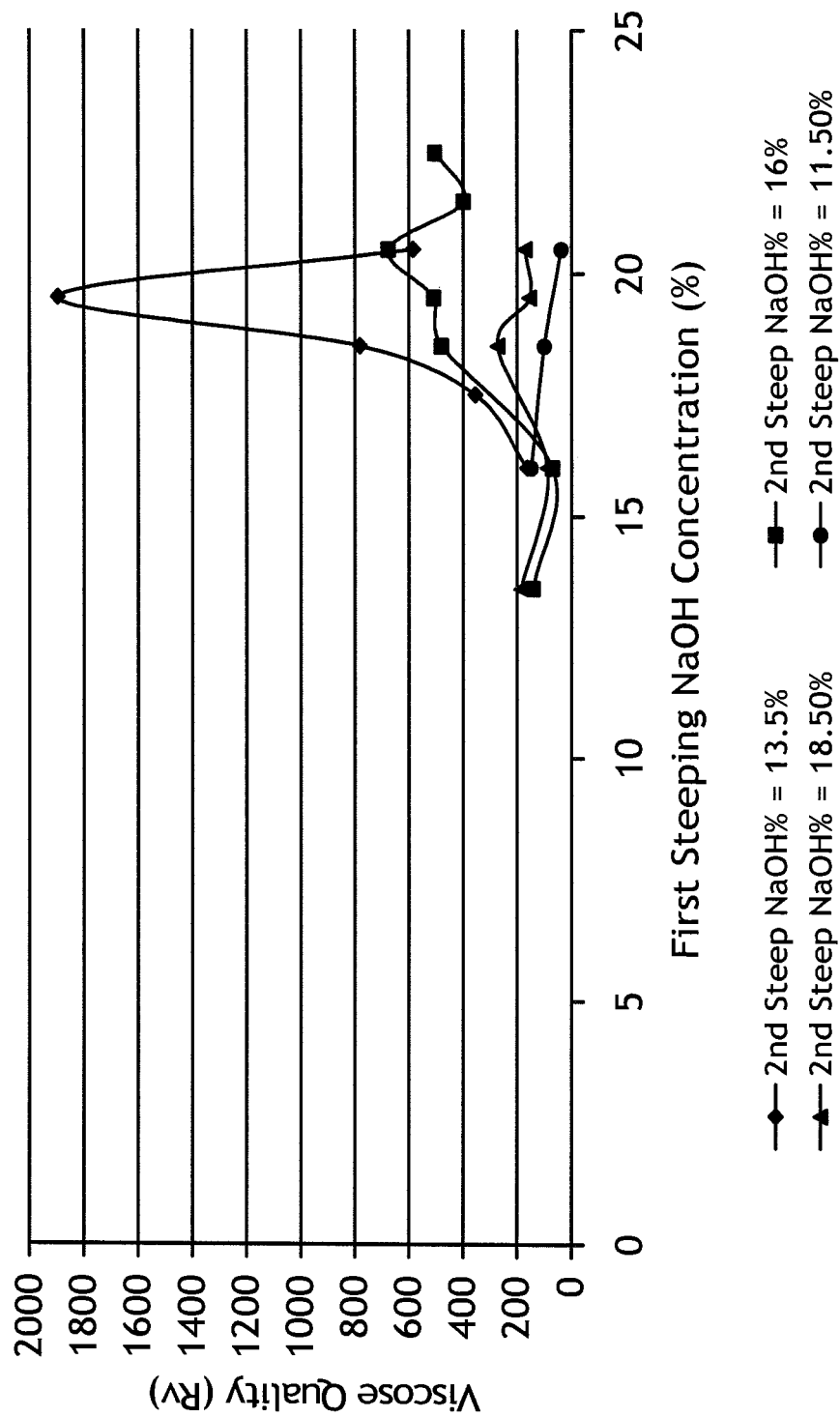
FIG. 2 is a graph showing the relationship between viscose quality (Rv) and NaOH concentration in the first steep under controlled second steep conditions for Southern Bleached Softwood Kraft pulp in a double steep process.

FIG. 2 shows the relationship between viscose quality (Rv) and the NaOH concentration in the first steep under controlled second steep conditions.

Example 2

SBSK Single Steep Optimisation (Comparative Example)

Southern Bleached Softwood Kraft pulp (a non-dissolving pulp) was used to prepare various viscose solutions.

In this set of experiments, Southern Bleached Softwood Kraft pulp (hereinafter 'the pulp') was steeped in a liquor having a specific NaOH concentration at 55° C. for 30 minutes in the presence of 0.015% $MnSO_4$ catalyst, 0.08% Berol 44 and 0.25% Berol 388 by weight of cellulose. The NaOH concentration was varied in each experiment between 11.5% w/w and 20.5% w/w.

The resultant steeped pulp was pressed using standard laboratory conditions (a steel press box with wire gauze, pressed hydraulically to 10 psi for 30 seconds) and shredded. The resultant pulp was mercerised at a temperature of 50° C. for 200 minutes.

Xanthation of the product was carried out under a vacuum pressure of 25 mm/Hg using 31% $CS_2$ by weight of cellulose at a temperature of 27° C. for 140 minutes. The resulting product was then dissolved to obtain a viscose solution having a cellulose in viscose (CiV) content of 9% and a soda in viscose (SiV) content of 6%.

The Rv and TVW values of the resulting viscose solutions are provided in Table 2.

In these experiments, it was not possible to generate a viscose solution using a steeping NaOH concentration of less than 14.5% w/w due to a lack of solubility of the xanthate. On dissolving, a thick gel was created which was not possible to homogenise.

Figure 3:
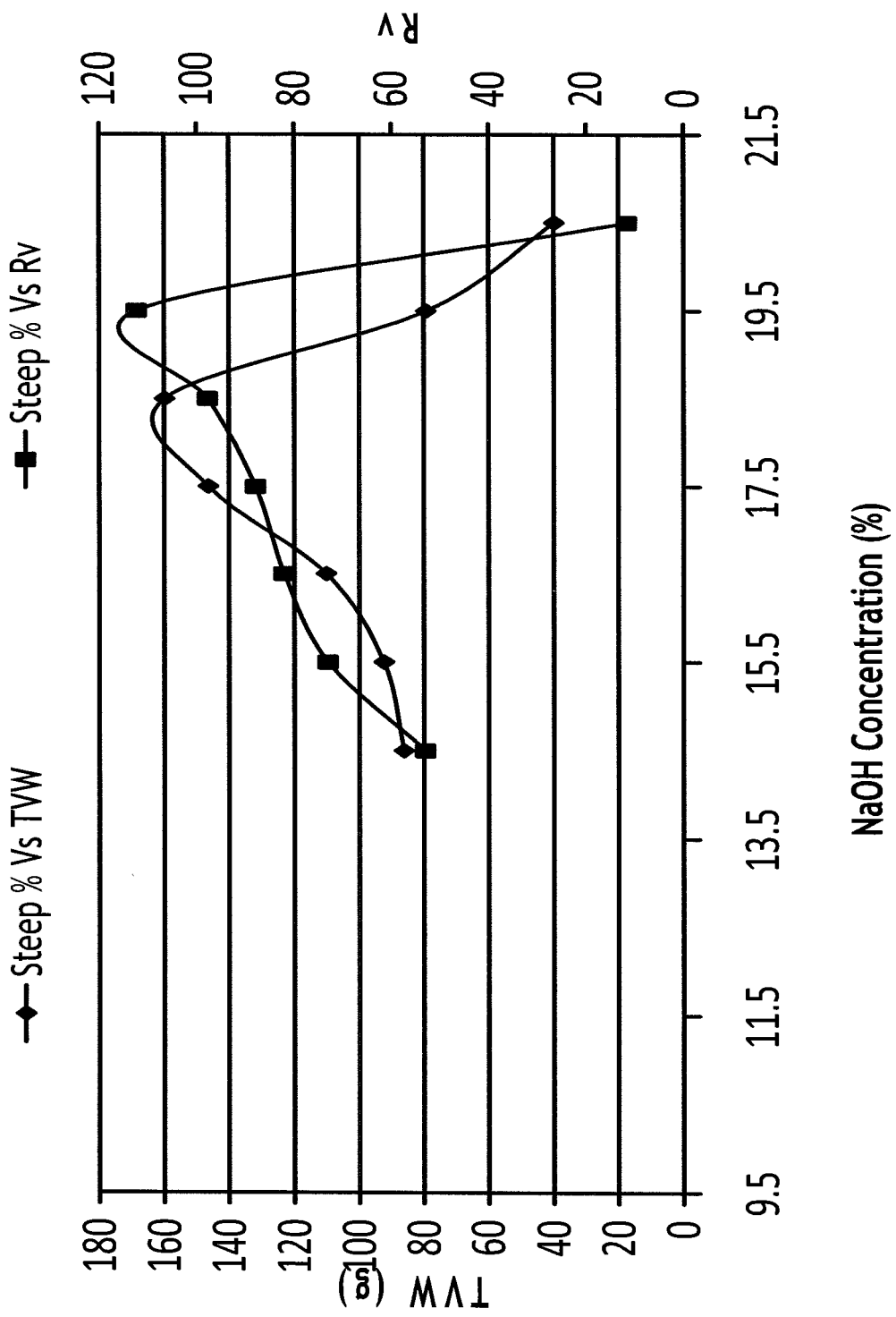
FIG. 3 is a graph showing the relationship between viscose quality (Rv and TVW) and NaOH concentration in the steep for Southern Bleached Softwood Kraft pulp in a single steep process.

FIG. 3 shows the relationship between viscose quality (Rv and TVW) and the NaOH concentration in the steep.

Figure 4:
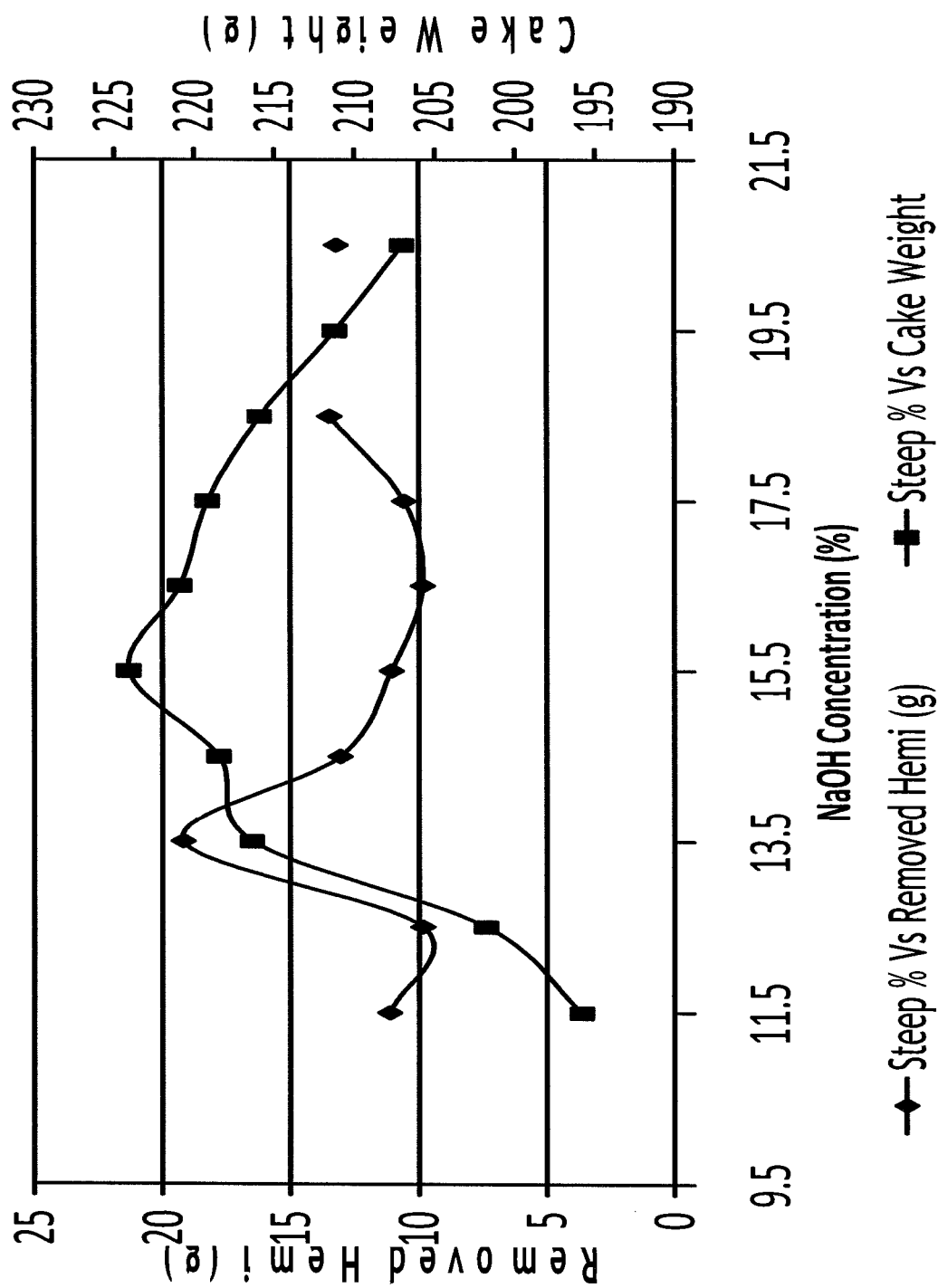
FIG. 4 is a graph showing the relationship between the amount of hemi-cellulose removed and the weight of the pressed product, against NaOH concentration in the steep for Southern Bleached Softwood Kraft pulp in a single steep process.

FIG. 4 shows the relationship between the amount of hemi-cellulose removed and the weight of the pressed product, against the NaOH concentration in the steep.

TABLE 2

Rv and TVW values for Southern Bleached Softwood Kraft pulp in single steep optimisation experiments

| | | | | | | Caustic | | | | | | | | | | | |
|---|---|---|---|---|---|---|---|---|---|---|---|---|---|---|---|---|---|
| | | AC | | | | | | Recycled NaOH | | | | | | | | | |
| NaOH | Cake | | | Grams | SiAC/ NaOH | Hemi Removed | | | | | RNaOH/ NaOH | | | | Viscose | | |
| (%) | (g) | CiAC | SiAC | Cello | Ratio | % | G | G | Mls | % | Ratio | Rv | TVW | BFV | FC | CiV | SiV | FR |
| 11.5 | 195.8 | 37.4 | 10.3 | 73.2292 | 0.896 | 0.58 | 11.136 | 1920 | 1710 | 11.5 | 1.000 | 0 | 0 | — | — | — | — | |
| 12.5 | 201.8 | 35.5 | 11.1 | 71.639 | 0.888 | 0.53 | 9.858 | 1860 | 1650 | 12.43 | 0.994 | 0 | 0 | — | — | — | — | |
| 13.5 | 216.4 | 32.3 | 12.9 | 69.8972 | 0.956 | 1.02 | 19.176 | 1880 | 1650 | 13.49 | 0.999 | 0 | 0 | — | — | — | — | |
| 14.5 | 218.5 | 32.2 | 13.4 | 70.357 | 0.924 | 0.68 | 13.056 | 1920 | 1680 | 14.47 | 0.998 | 53 | 86.2 | 79 | 11 | 8.7 | 6.38 | 0.61 |
| 15.5 | 224.1 | 32 | 14.3 | 71.712 | 0.923 | 0.57 | 11.058 | 1940 | 1680 | 15.38 | 0.992 | 73.1 | 92.3 | 81 | 36 | 8.9 | 6.05 | 0.79 |
| 16.5 | 220.9 | 32.3 | 14.5 | 71.3507 | 0.879 | 0.51 | 9.843 | 1930 | 1660 | 15.98 | 0.968 | 82.1 | 110.1 | 64 | 75 | 8.7 | 5.84 | 0.75 |
| 17.5 | 219.2 | 32.2 | 15.7 | 70.5824 | 0.897 | 0.54 | 10.584 | 1960 | 1660 | 17.46 | 0.998 | 87.9 | 146.4 | 42 | 0 | 8.6 | 6.23 | 0.60 |
| 18.5 | 215.9 | 32.9 | 15.8 | 71.0311 | 0.854 | 0.68 | 13.464 | 1980 | 1660 | 18.05 | 0.976 | 97.7 | 159.9 | 35 | 5 | 8.7 | 6.01 | 0.61 |
| 19.5 | 211.2 | 32.2 | 16.5 | 68.0064 | 0.846 | | | 2005 | 1660 | | | 112 | 79.4 | 73 | 0 | 9.9 | 6.1 | 1.41 |
| 20.5 | 207 | 34.6 | 17.1 | 71.622 | 0.834 | 0.65 | 13.195 | 2030 | 1680 | 19.88 | 0.970 | 11.6 | 39.8 | 45 | 661 | 8.7 | 5.51 | 0.29 |

Figure 5:
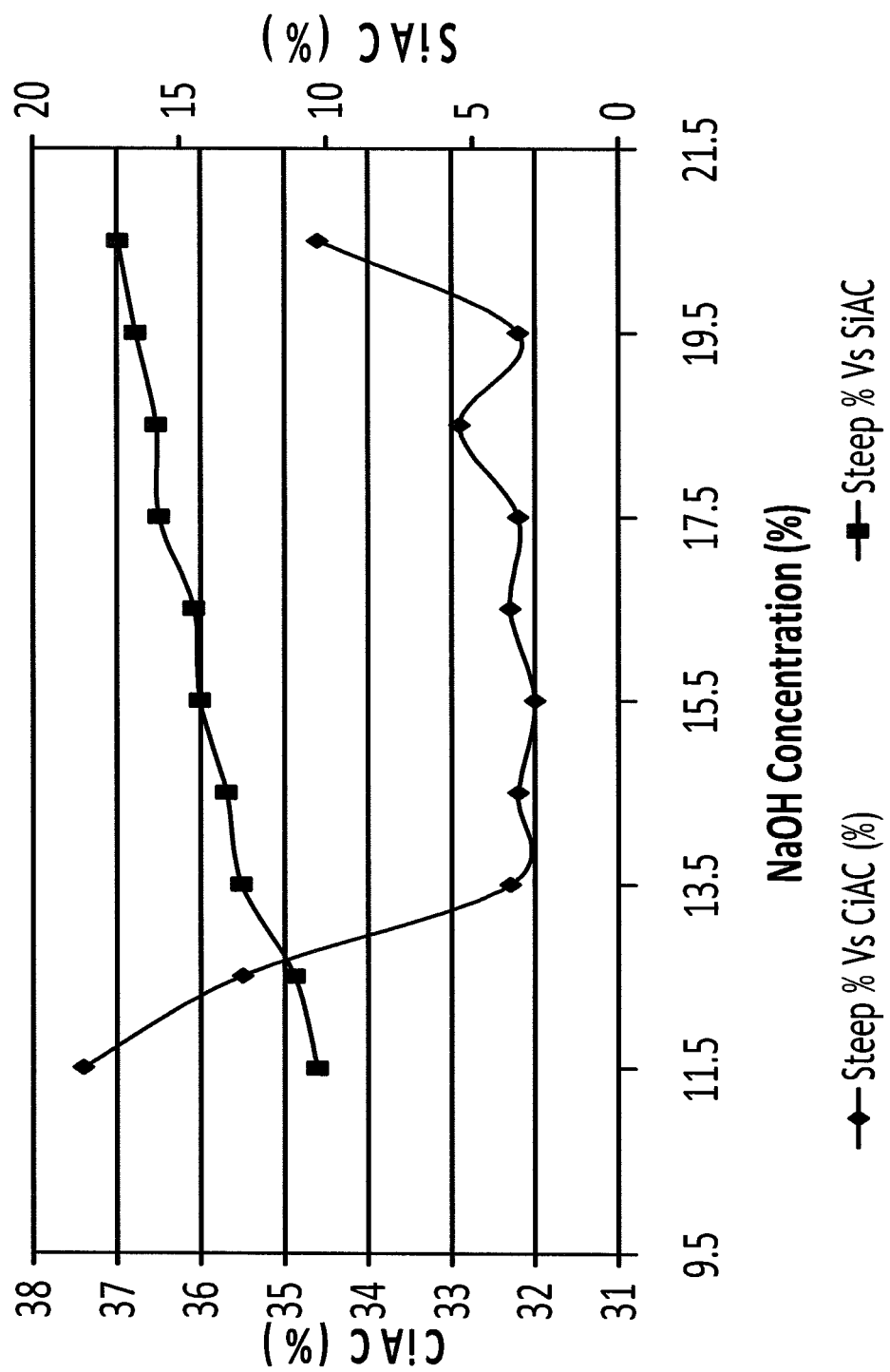
FIG. 5 is a graph showing the relationship between the amount of caustic in alkali cellulose (CiAC) and the amount of soda in alkali cellulose (SiAC), against NaOH concentration in the steep for Southern Bleached Softwood Kraft pulp in a single steep process.

FIG. 5 shows the relationship between the amount of caustic in alkali cellulose (CiAC) and the amount of soda in alkali cellulose (SiAC), against the NaOH concentration in the steep.

From the results in Examples 1 and 2 it can be seen that the double steeping process greatly improves the quality of the viscose solution derived from Southern Bleached Softwood Kraft pulps. The double steeping process may increase the maximum obtainable Rv and also widen the processing window with respect to the steeping caustic concentration.

It can also be seen that the caustic concentration in the first and second steeping steps directly affects the quality of the viscose solution produced. It seems that the concentrations of the two steeping steps work symbiotically and should be selected in conjunction with each other rather than independently of each other. Further to this, it appears that it may be advantageous to select a caustic concentration in the second steep which is lower than that in the first steep.

Example 3

SBSK Optimised Double Steep Xanthation Conditions: $CS_2$ Reduction

Southern Bleached Softwood Kraft pulp (a non-dissolving pulp) was used to prepare various viscose solutions using a similar method to that in Example 1 with the difference that 0.25% Berol 388 by weight of cellulose was added to the first steep. The NaOH concentration in the first steep was 19.5% w/w and 13.5% w/w in the second steep (these amounts were not varied between experiments).

The amount of carbon disulphide used in the xanthation step was varied between 23% and 31% by weight of cellulose and the target soda in viscose (SiV) values were varied between 3.5% and 6%.

The Rv values of the resulting viscose solutions are provided in Table 3.

TABLE 3

Rv values for Southern Bleached Softwood Kraft pulp with varying amounts of $CS_2$ added in xanthation

| $CS_2$ Content (% on Cellulose) | SiV (%) | Viscose Quality (Rv) |
|---|---|---|
| 31 | 6 | 1921 |
| 29 | 6 | 1352 |

TABLE 3-continued

Rv values for Southern Bleached Softwood Kraft pulp with varying amounts of $CS_2$ added in xanthation

| $CS_2$ Content (% on Cellulose) | SiV (%) | Viscose Quality (Rv) |
|---|---|---|
| 27 | 6 | 1005 |
| 25.5 | 6 | 661 |
| 23 | 6 | 311 |
| 29 | 4.5 | 1025 |
| 29 | 3.5 | 287 |

Figure 6:
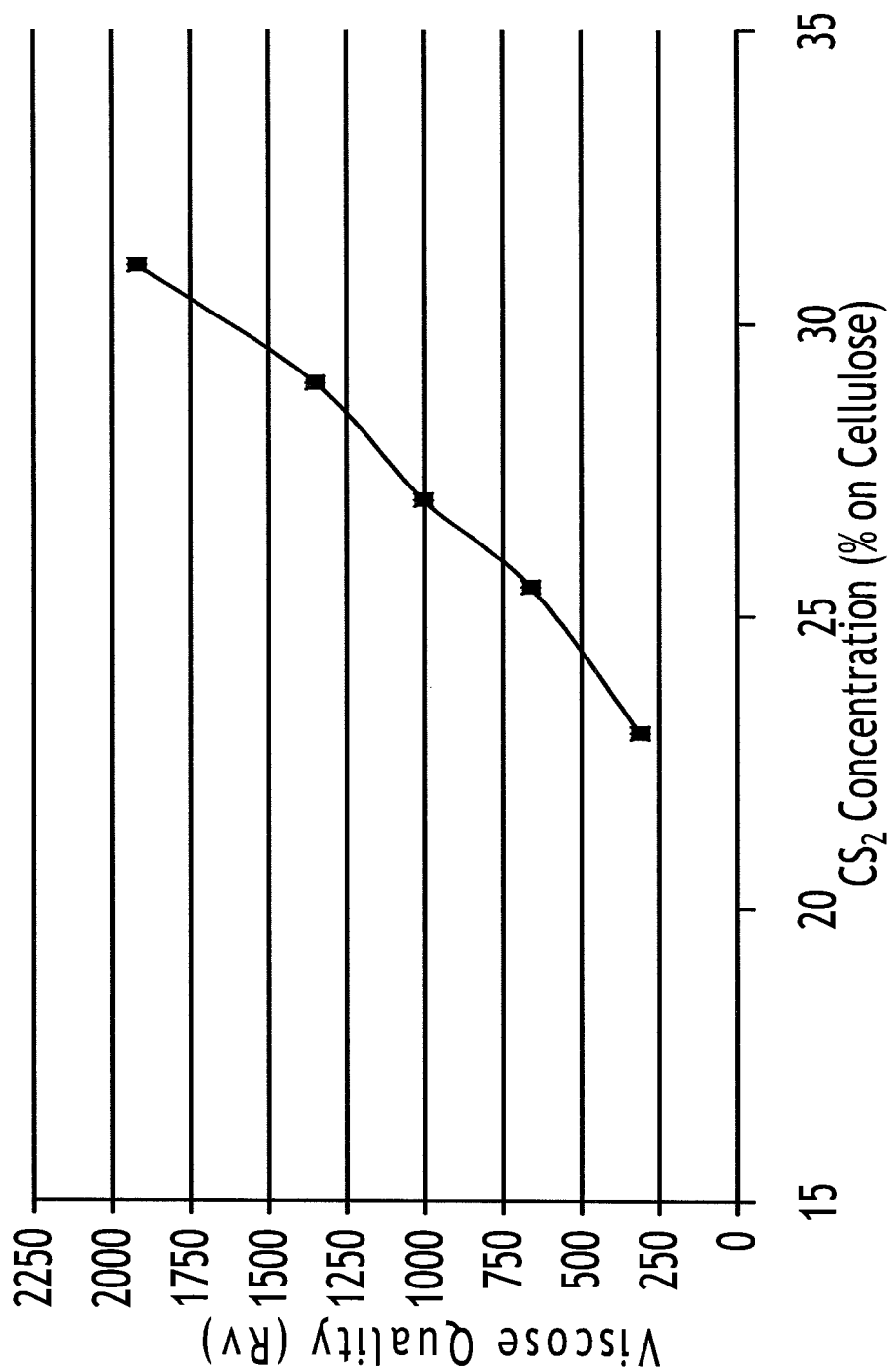
FIG. 6 is a graph showing the relationship between viscose quality (Rv) and the amount of $CS_2$ used, for Southern Bleached Softwood Kraft pulp in a double steep process.

FIG. 6 shows the relationship between viscose quality (Rv) and the amount of $CS_2$ used in the optimised process.

Figure 7:
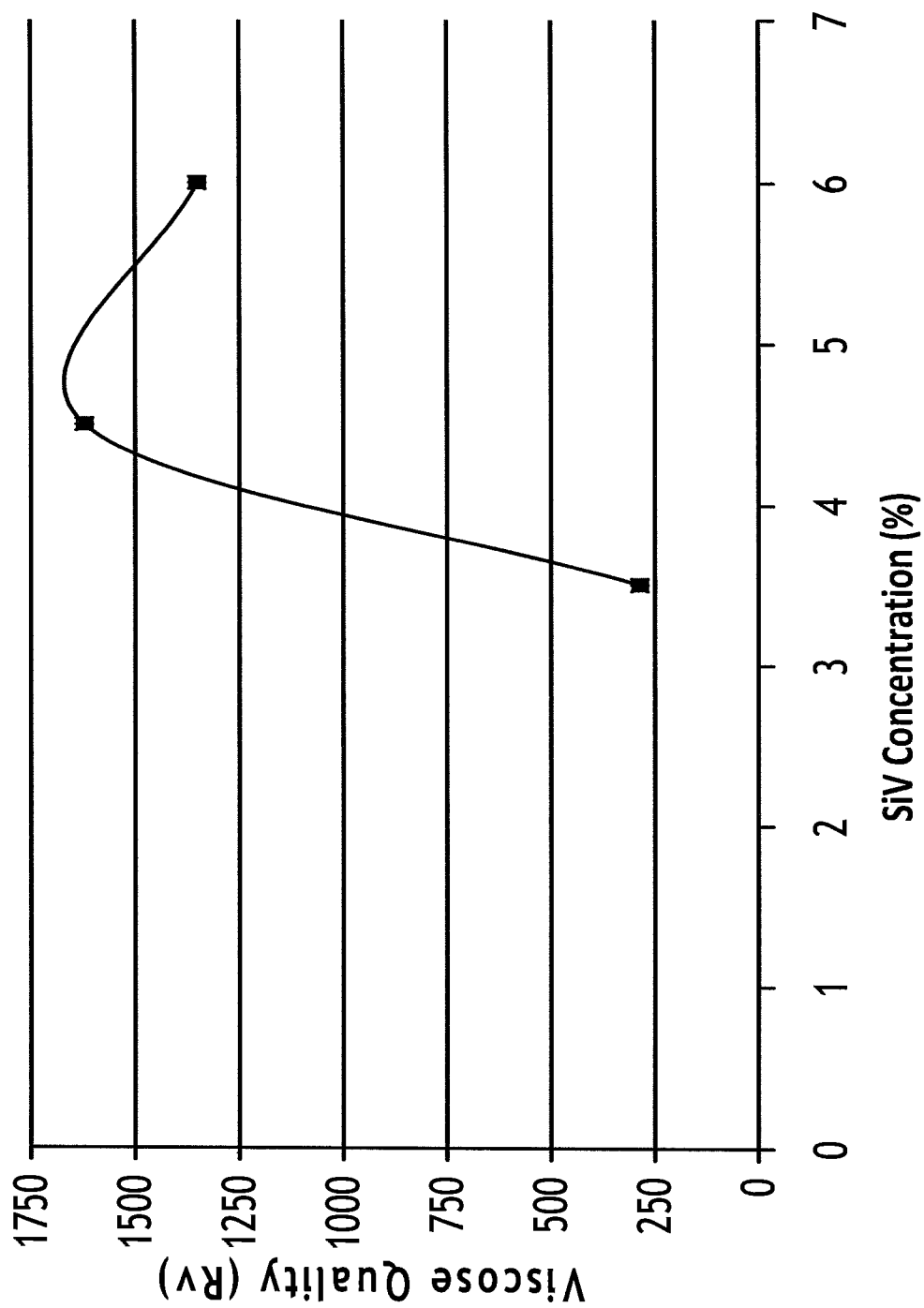
FIG. 7 is a graph showing the relationship between viscose quality (Rv) and SiV concentration used, for Southern Bleached Softwood Kraft pulp in a double steep process.

FIG. 7 shows the relationship between viscose quality (Rv) and the SiV concentration used in the optimised process.

The results show that there is the potential to significantly reduce the amount of $CS_2$ required in the xanthation step of the optimised process. The results also show that it may be possible to reduce the SiV content in conjunction with a $CS_2$ reduction.

Example 4

SBSK Optimised Double Steep Additive Study: Berol 388

Southern Bleached Softwood Kraft pulp (a non-dissolving pulp) was used to prepare various viscose solutions using a similar method to that in Example 1. The NaOH concentration in the first steep was 19.5% w/w and 13.5% w/w in the second steep, and the amount of $CS_2$ used in xanthation was 25.5% by weight of cellulose.

The addition of Berol 388 was varied in each experiment, with additions being made in either one or both of the first and second steep, in amounts varying from 0.125% to 0.5% by weight of cellulose.

The Rv values of the resulting viscose solutions are provided in Table 4.

TABLE 4

Rv values for Southern Bleached Softwood Kraft pulp with varying amounts of Berol 388

| % Berol 388 in 1st Steep | % Berol 388 in 2nd Steep | Viscose Quality (Rv) |
|---|---|---|
| 0 | 0.25 | 609 |
| 0 | 0.5 | 509 |
| 0.125 | 0.125 | 448 |
| 0.25 | 0.25 | 1213 |

The results show that the amount of Berol 388 added to the first and second steep has an effect on the quality of the viscose solution produced. There is an observed benefit of using Berol 388 in both the first and second steep. However, it seems that the amount of Berol 388 in the second steep is more important (than in the first steep) when selecting an appropriate additive system. This could be because Berol 388 has the primary function of increasing the absorption of $CS_2$ by the alkali cellulose during xanthation.

Example 5

BEK Double Steep Optimisation

Bleached *Eucalyptus* Kraft pulp (a non-dissolving pulp) was used to prepare various viscose solutions.

In this set of experiments, the method in Example 1 was used to produce the viscose solution with the difference that the NaOH concentration in the first and second steep was varied in each experiment between 11.5% w/w and 19.5% w/w.

The Rv and TVW values of the resulting viscose solutions are provided in Table 5.

TABLE 5

Rv and TVW values for Bleached *Eucalyptus* Kraft pulp in double steep optimisation experiments

| Steeping Caustic | | | | Results | | |
|---|---|---|---|---|---|---|
| Steep 1 NaOH conc. (% w/w) | Steep 2 NaOH conc. (% w/w) | S1/S2 NaOH conc. Ratio | AC SiAC after 2nd steep | Rv | TVW | Total hemi-cellulose removed (g) |
| 19.5 | 19.5 | 1 | — | 527.6 | 61.6 | — |
| 19.5 | 17.5 | 1.11 | 15.5 | 663.2 | 320.9 | — |
| 19.5 | 15.5 | 1.26 | 14.1 | 607.4 | 262 | — |
| 19.5 | 11.5 | 1.7 | 11.2 | 28.7 | 64.6 | 15.39 |
| 18.5 | 18.5 | 1 | 16 | 350.7 | 299.4 | — |
| 17.5 | 17.5 | 1 | — | 939 | 108.2 | 22.36 |
| 17.5 | 15.5 | 1.13 | 14 | 280 | 150 | 14.85 |
| 17.5 | 13.5 | 1.3 | 13.1 | 205.1 | 213.5 | 16.29 |
| 16.5 | 17.5 | 0.94 | — | 647 | 139.2 | — |
| 16.5 | 16.5 | 1 | 14.7 | 1319 | 141.3 | — |
| 15.5 | 19.5 | 0.79 | 16.3 | 437 | 91.5 | 17.76 |
| 15.5 | 17.5 | 0.89 | 15.4 | 727.2 | 146.6 | 19.83 |
| 15.5 | 15.5 | 1 | 14.2 | 438.6 | 91.5 | 11.87 |
| 15.5 | 13.5 | 1.15 | 13 | 111.2 | 140 | 18.13 |
| 15.5 | 11.5 | 1.35 | 11.6 | 41.5 | 39.4 | 18.58 |
| 13.5 | 17.5 | 0.77 | 15.2 | 483.4 | 96.7 | 10.6 |
| 13.5 | 15.5 | 0.87 | 13.9 | 26.3 | 37.5 | 34.12 |
| 11.5 | 19.5 | 0.59 | 16.4 | 203.5 | 57.3 | 10.45 |
| 11.5 | 17.5 | 0.66 | 14.9 | 451 | 135.2 | — |

Figure 8:
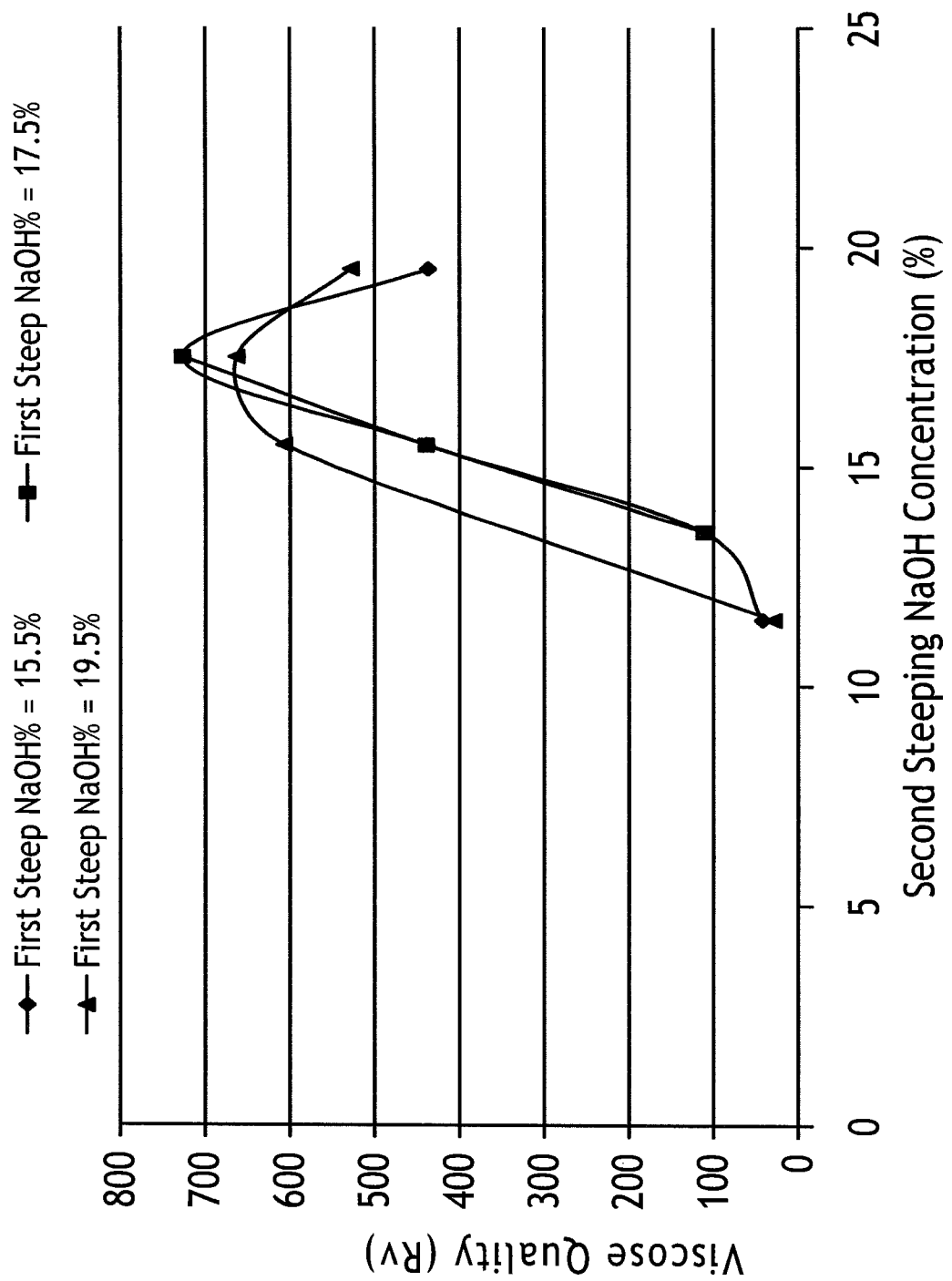
FIG. 8 is a graph showing the relationship between viscose quality (Rv) and NaOH concentration in the second steep under controlled first steep conditions, for Bleached *Eucalyptus* Kraft pulp in a double steep process.

FIG. 8 shows the relationship between viscose quality (Rv) and the NaOH concentration in the second steep under controlled first steep conditions.

Figure 9:
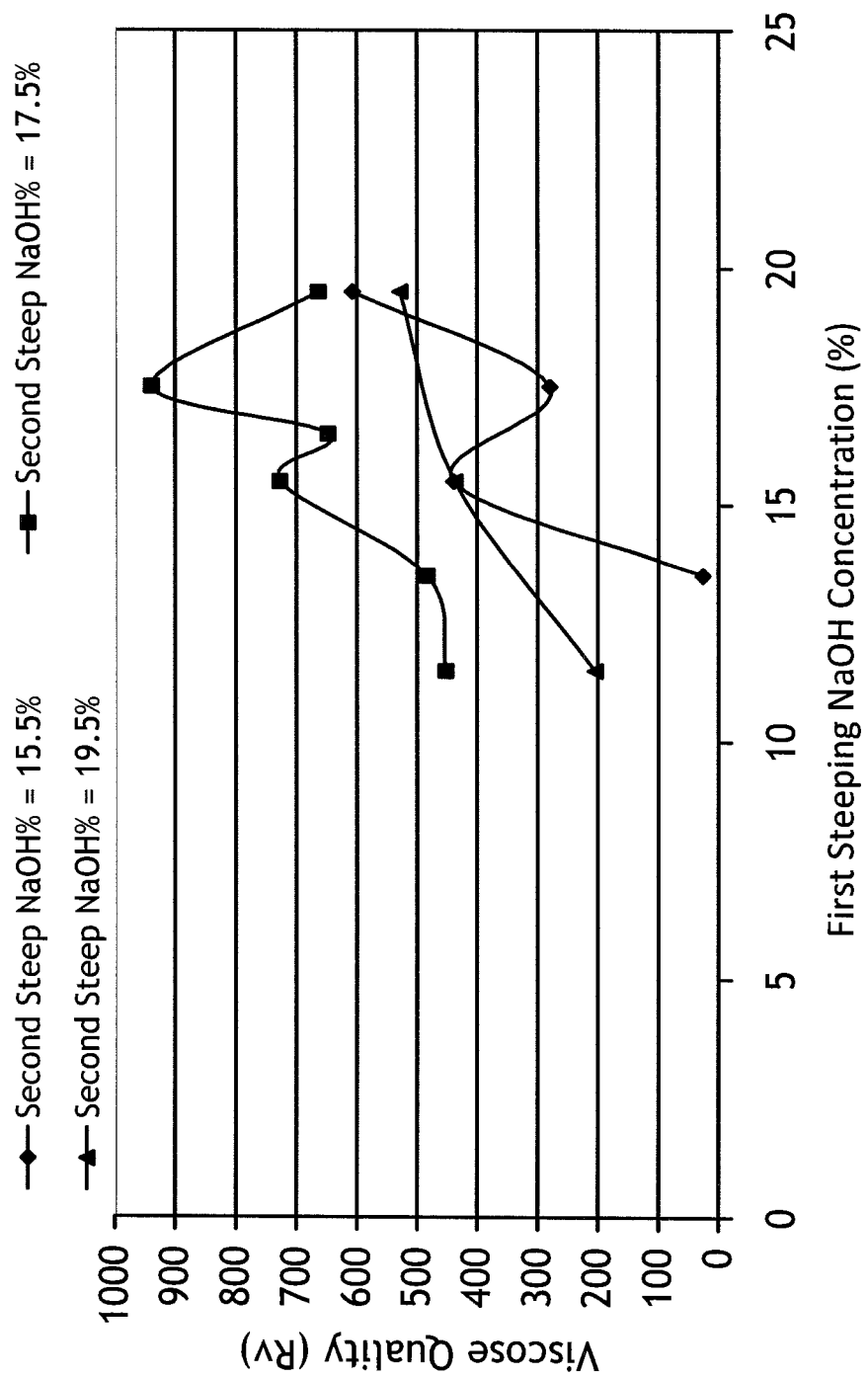
FIG. 9 is a graph showing the relationship between viscose quality (Rv) and NaOH concentration in the first steep under controlled second steep conditions, for Bleached *Eucalyptus* Kraft pulp in a double steep process.

FIG. 9 shows the relationship between viscose quality (Rv) and the NaOH concentration in the first steep under controlled second steep conditions.

Figure 10:
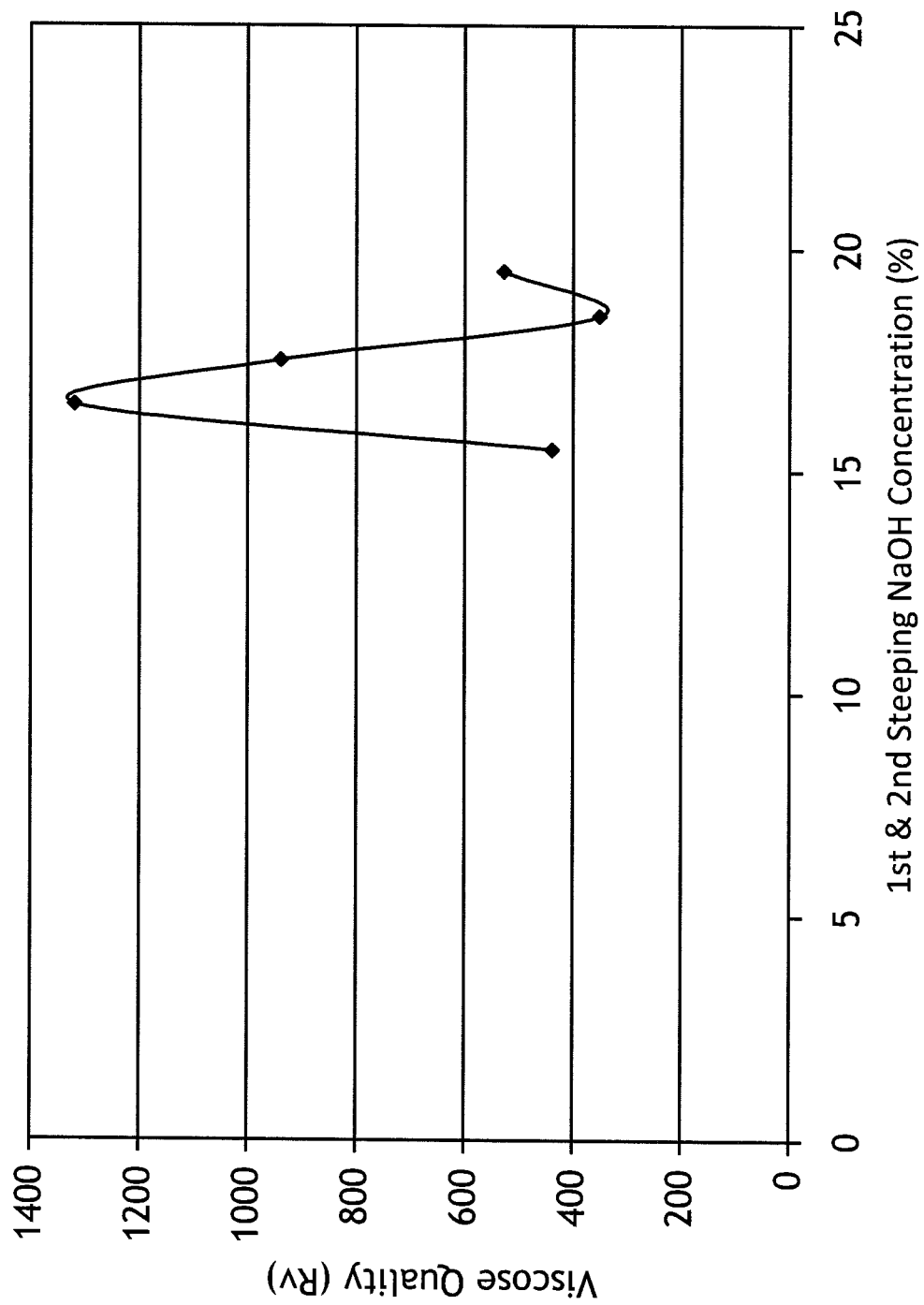
FIG. 10 is a graph showing the relationship between viscose quality (Rv) and NaOH concentration in the first and second steep, when both concentrations are the same, for Bleached *Eucalyptus* Kraft pulp in a double steep process.

FIG. 10 shows the relationship between viscose quality (Rv) and the NaOH concentration in the first and second steep, when both concentrations are the same.

Example 6

BEK Single Steep Optimisation (Comparative Example)

Bleached *Eucalyptus* Kraft pulp (a non-dissolving pulp) was used to prepare various viscose solutions.

In this set of experiments, the method in Example 2 was used to produce the viscose solution with the difference that 0.5% Berol 388 by weight of cellulose was used during the steeping step and the product was mercerised for 1500 minutes at 50° C. (as opposed to 200 minutes).

The Rv and TVW values of the resulting viscose solutions are provided in Table 6.

Again, it was not possible to generate a viscose solution using a steeping NaOH concentration of less than 14.5% w/w due to a lack of solubility of the xanthate.

Figure 11:
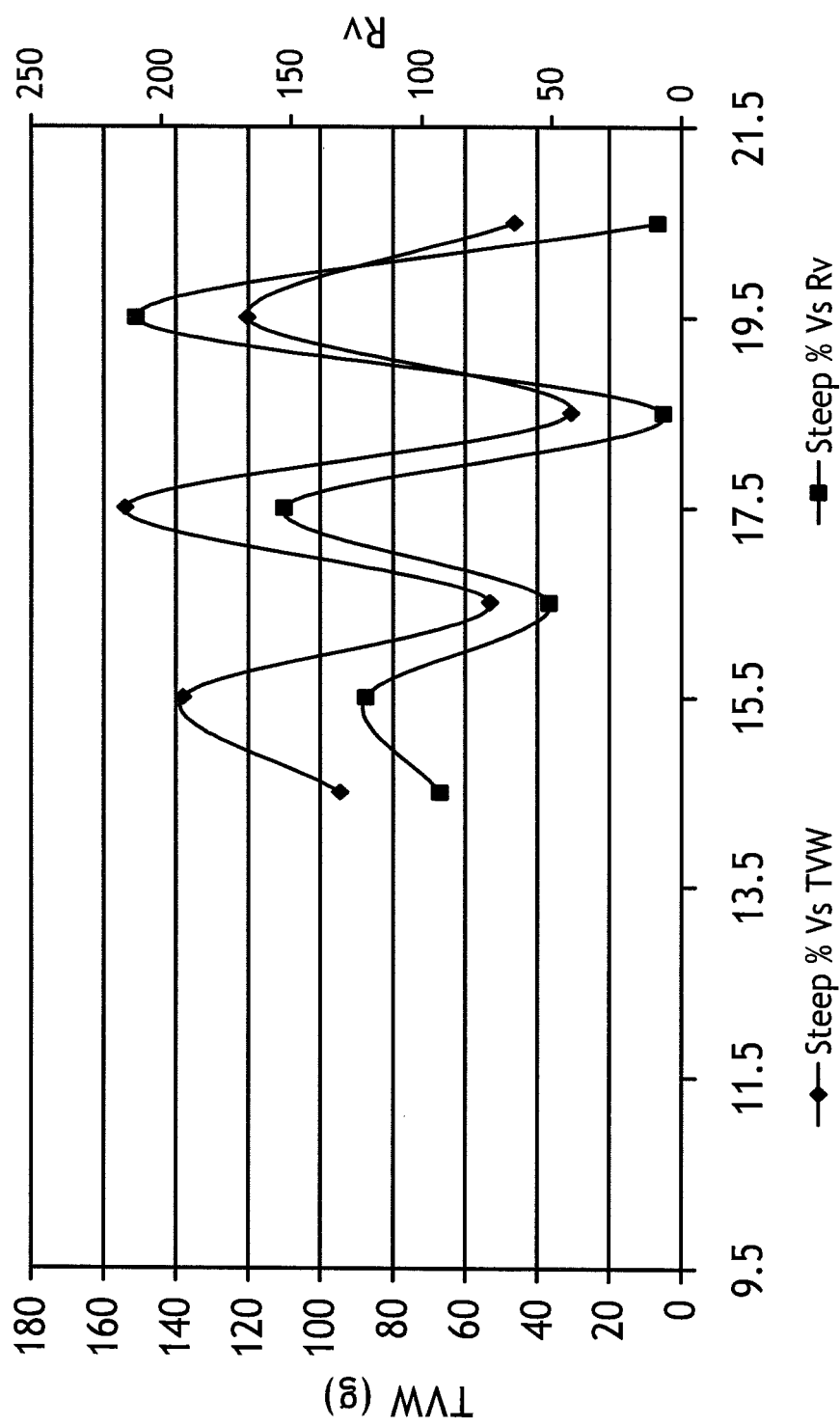
FIG. 11 is a graph showing the relationship between viscose quality (Rv and TVW) and NaOH concentration in the steep, for Bleached *Eucalyptus* Kraft pulp in a single steep process.

FIG. 11 shows the relationship between viscose quality (Rv and TVW) and the NaOH concentration in the steep.

Figure 12:
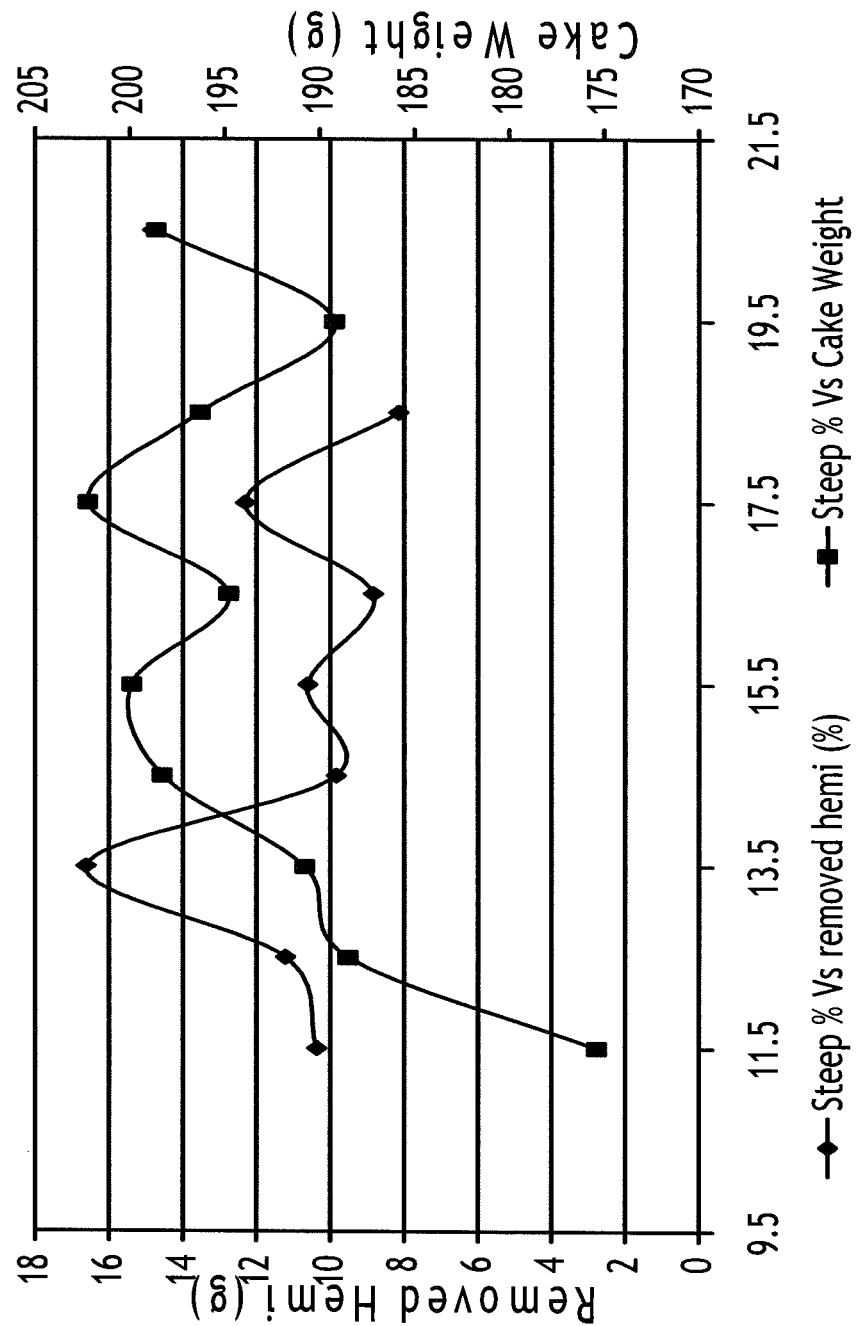
FIG. 12 is a graph showing the relationship between the amount of hemi-cellulose removed and the weight of the pressed product, against NaOH concentration in the steep, for Bleached *Eucalyptus* Kraft pulp in a single steep process.

FIG. 12 shows the relationship between the amount of hemi-cellulose removed and the weight of the pressed product, against the NaOH concentration in the steep.

Figure 13:
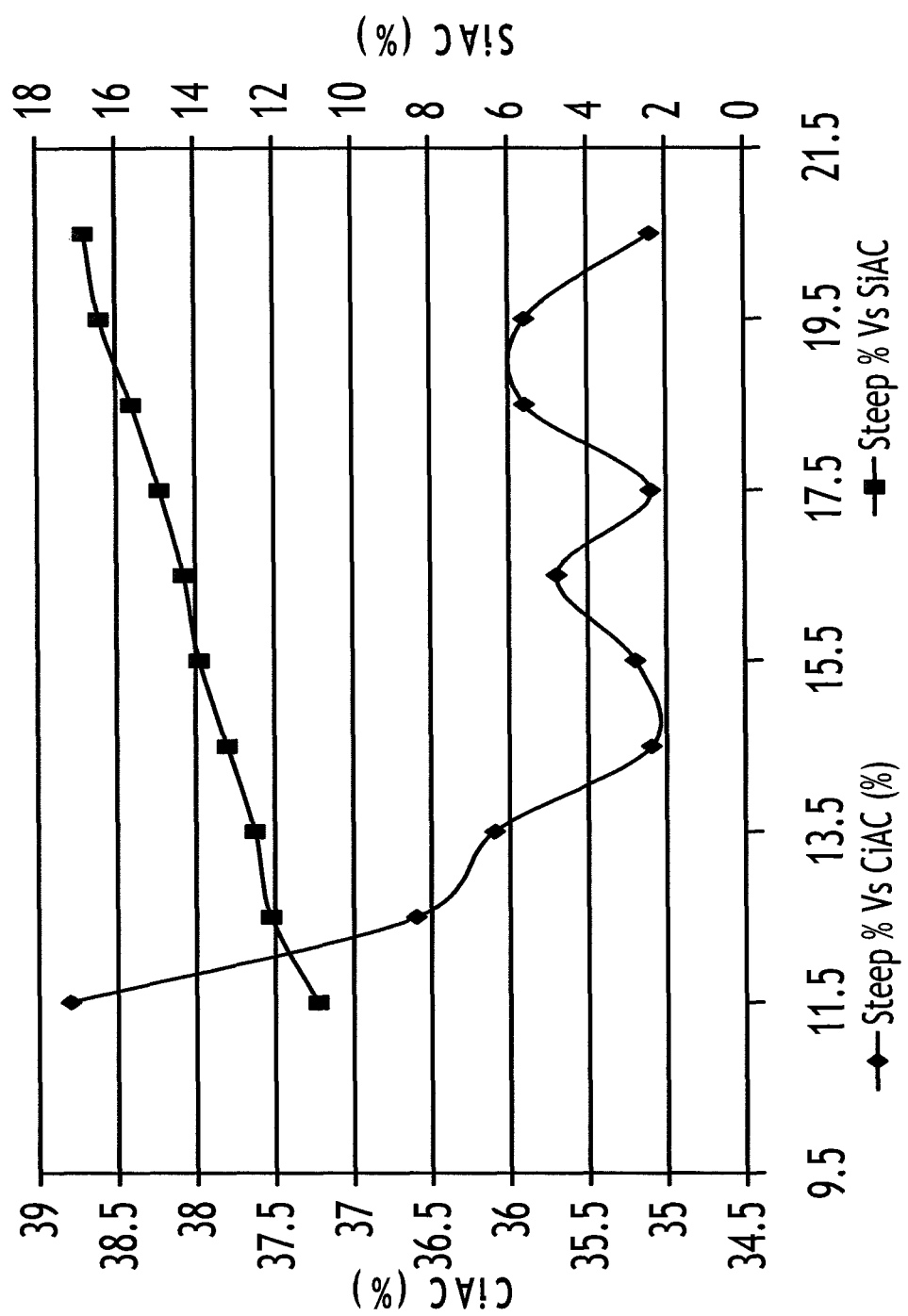
FIG. 13 is a graph showing the relationship between the amount of caustic in alkali cellulose (CiAC) and the amount of soda in alkali cellulose (SiAC), against the NaOH concentration in the steep, for Bleached *Eucalyptus* Kraft pulp in a single steep process.

FIG. 13 shows the relationship between the amount of caustic in alkali cellulose (CiAC) and the amount of soda in alkali cellulose (SiAC), against the NaOH concentration in the steep.

From the results in Examples 5 and 6 it can be seen that the double steeping process greatly improves the quality of the viscose solution derived from Bleached *Eucalyptus* Kraft pulps.

It seems possible to reduce the 'multimodal effect' of steeping concentration variation observed in the single steeping experiments through the double steeping process, thus providing a stable viscose process for Bleached *Eucalyptus* Kraft pulps. One way in which this seems to be achieved is by setting the second steeping concentration at a particular value.

TABLE 6

Rv and TVW values for Bleached *Eucalyptus* Kraft pulp in single steep optimisation experiments

| | AC | | | | | | Caustic | | | | | Viscose | | | | |
|---|---|---|---|---|---|---|---|---|---|---|---|---|---|---|---|---|
| | | | | | | | | Recycled NaOH | | | | | | | | |
| NaOH | | | | | SiAC/ NaOH | Hemi Removed | | | | | RNaOH/ NaOH | | | | | |
| (%) | Cake (g) | CiAC | SiAC | Grams Cello | Ratio | % | G | G | Mls | % | Ratio | Rv | TVW | BFV | FC | CiV | SiV |
| 11.5 | 175.4 | 38.8 | 10.9 | 68.0552 | 0.948 | 0.54 | 10.368 | 1920 | 1700 | 11.49 | 0.999 | 0 | 0 | — | — | — | — |
| 12.5 | 188.5 | 36.6 | 12.1 | 68.991 | 0.968 | 0.6 | 11.22 | 1870 | 1660 | 12.48 | 0.998 | 0 | 0 | — | — | — | — |
| 13.5 | 190.8 | 36.1 | 12.5 | 68.8788 | 0.926 | 0.87 | 16.617 | 1910 | 1680 | 13.45 | 0.996 | 0 | 0 | — | — | — | — |
| 14.5 | 198.3 | 35.1 | 13.2 | 69.6033 | 0.910 | 0.51 | 9.843 | 1930 | 1680 | 13.92 | 0.960 | 93 | 94.6 | 101 | 51 | 9.25 | 5.88 |
| 15.5 | 199.9 | 35.2 | 13.9 | 70.3648 | 0.897 | 0.55 | 10.615 | 1930 | 1660 | 15.32 | 0.989 | 121.6 | 138 | 54 | 59 | 9.32 | 6.06 |
| 16.5 | 194.8 | 35.7 | 14.3 | 69.5436 | 0.867 | 0.47 | 8.836 | 1880 | 1600 | 16.4 | 0.994 | 51.1 | 53.2 | 41 | 721 | 9.1 | 5.91 |
| 17.5 | 202.2 | 35.1 | 14.9 | 70.9722 | 0.851 | 0.6 | 12.3 | 2050 | 1740 | 16.87 | 0.964 | 152.9 | 154 | 57 | 20 | 9.3 | 5.96 |
| 18.5 | 196.3 | 35.9 | 15.6 | 70.4717 | 0.843 | 0.42 | 8.148 | 1940 | 1630 | 18.22 | 0.985 | 7 | 30.7 | 21 | 1151 | 9.29 | 5.97 |
| 19.5 | 189.2 | 35.9 | 16.4 | 67.9228 | 0.841 | | | 2051 | 1700 | | | 209.7 | 120.99 | 70 | 25 | 9.82 | 5.96 |
| 20.5 | 198.6 | 35.1 | 16.8 | 69.7086 | 0.820 | 0.73 | 14.819 | 2030 | 1680 | 19.94 | 0.973 | 9.1 | 46.4 | 22 | 456 | 9.33 | 6.1 |

The invention claimed is:

1. A process for the manufacture of viscose comprising the steps of:
  a) providing a non-dissolving pulp having a hemi-cellulose content of 10% or greater and/or an alpha-cellulose content of 90% or lower as a raw material;
  b) steeping the pulp in caustic solution;
  c) processing the steeped pulp;
  d) steeping the processed steeped pulp for a second time in caustic solution; and
  e) further processing the pulp from step d) to form a viscose solution;
  wherein:
  i) the pulp comprises a Softwood Kraft pulp as at least the or a major component, and the caustic concentration of the solution in step d) is at least about 11.5% w/w and the ratio of caustic concentration in the solution of step b) to that of the solution in step d) (the S1/S2 ratio) is from 1 to 1.8;
  ii) the pulp comprises a Bleached *Eucalyptus* pulp as at least the or a major component, and the caustic concentration of the solution in step d) is from 15% w/w to 20% w/w and the ratio of caustic concentration in the solution of step b) to that of the solution in step d) (the S1/S2 ratio) is from 0.1 to 5; or
  iii) the pulp comprises a non-dissolving pulp other than a Softwood Kraft or Bleached *Eucalyptus* pulp as at least the or a major component, and the caustic concentration of the solution in step d) is at least about 11.5% w/w and the ratio of caustic concentration in the solution of step b) to that of the solution in step d) (the S1/S2 ratio) is from 0.1 to 5.

2. The process according to claim 1, wherein:
  a) the pulp comprises Northern Bleached Softwood Kraft pulp or Southern Bleached Softwood Kraft pulp as at least the or a major component, and the S1/S2 ratio is from 1 to 1.8;
  b) the pulp comprises Bleached *Eucalyptus* Kraft pulp as at least the or a major component, and the S1/S2 ratio is from 0.1 to 5; or
  c) the pulp comprises hardwood pulp, fluff pulp and/or cotton linters as at least the or a major component, and the S1/S2 ratio is from 0.1 to 5.

3. The process according to claim 2, wherein the pulp comprises Northern Bleached Softwood Kraft pulp or Southern Bleached Softwood Kraft pulp as at least the or a major component, and the S1/S2 ratio is from 1.1 to 1.7.

4. The process according to claim 3, wherein the pulp comprises Northern Bleached Softwood Kraft pulp or Southern Bleached Softwood Kraft pulp as at least the or a major component, and the S1/S2 ratio is from 1.15 to 1.55.

5. The process according to claim 2, wherein the pulp comprises Bleached *Eucalyptus* Kraft pulp as at least the or a major component, and the S1/S2 ratio is:
  a) from 0.5 to 4;
  b) from 0.6 to 3; or
  c) from 0.7 to 2.

6. The process according to claim 2, wherein the pulp comprises Bleached *Eucalyptus* Kraft pulp as at least the or a major component, and the caustic concentration of the solution in step d) is:
  a) from 15.5% w/w to 19.5% w/w;
  b) from 16% w/w to 19% w/w;
  c) from 16.5% w/w to 18.5% w/w; or
  d) from 17% w/w to 18% w/w.

7. The process according to claim 2, wherein the pulp comprises Bleached *Eucalyptus* Kraft pulp as at least the or a major component, and the caustic concentration of the solution in step b) is from 11.5% w/w to 19.5% w/w.

8. The process according to claim 1, wherein the pulp comprises Northern Bleached Softwood Kraft pulp or Southern Bleached Softwood Kraft pulp as at least the or a major component, and the caustic concentration of the solution in step b) is from 17% w/w to 22% w/w.

9. The process according to claim 1, wherein the pulp comprises Northern Bleached Softwood Kraft pulp or Southern Bleached Softwood Kraft pulp as at least the or a major component, and the caustic concentration of the solution in step d) is:
  a) from 11.5% w/w to 18.5% w/w;
  b) from 12.5% w/w to 17.5% w/w; or
  c) from 12.5% w/w to 16.5% w/w.

10. The process according to claim 1, wherein the pulp comprises a non-dissolving pulp other than Softwood Kraft or Bleached *Eucalyptus* pulp as at least the or a major component, and the S1/S2 ratio is:
  a) from 0.5 to 4;
  a) from 0.6 to 3; or
  c) from 0.7 to 2.

11. The process according to claim 1, wherein the temperature of the steeping process in step b) is different from the temperature of the steeping process in step d).

12. The process according to claim 11, wherein the temperature of the steeping process in step b) is higher than the temperature of the steeping process in step d).

13. The process according to claim 1, wherein the temperature of the steeping process in step d) is at least about 28° C.

14. The process according to claim 1, wherein hemi-cellulose is present in the steeping caustic of step b) and/or step d).

15. The process according to claim 14, wherein at least some of the hemi-cellulose is removed from the steeping caustic in step b) and/or step d).

16. The process according to claim 15, wherein at least about 50% of the hemi-cellulose is removed from the steeping caustic in step b) and/or step d).

17. The process according to claim 15, wherein at least some of the removed hemi-cellulose is reintroduced into the pulp or viscose solution during or after step e).

18. The process according to claim 1, wherein step c) comprises pressing the steeped pulp.

19. The process according to claim 18, wherein step c) further comprises mercerising the pressed steeped pulp.

20. The process according to claim 1, wherein step e) comprises pressing the steeped pulp prior to forming the viscose solution.

21. The process according to claim 20, wherein step e) further comprises mercerising the pressed steeped pulp prior to forming the viscose solution.

22. The process according to claim 1, wherein the or a major component of the pulp signifies that said component constitutes at least about:
   a) 25%;
   b) 33%;
   c) 50%; or
   d) 51%
of the raw material pulp.

23. The process according to claim 1, wherein the raw material pulp comprises two or more of: a Softwood Kraft pulp; a Bleached *Eucalyptus* pulp; and a non-dissolving pulp other than a Softwood Kraft or Bleached *Eucalyptus* pulp; wherein at least two of the selected steeping conditions are selected with reference to at least one of the raw material pulp constituents.

24. The process according to claim 1, wherein in step e) the viscose solution is prepared by xanthating and dissolving the further processed pulp.

25. The process according to claim 1, wherein the viscose solution has a laboratory Rv of at least about 300.

26. The process according to claim 1, wherein the viscose solution has a plant Rv of at least about 10.

* * * * *